United States Patent
Liu et al.

(10) Patent No.: US 10,592,787 B2
(45) Date of Patent: Mar. 17, 2020

(54) FONT RECOGNITION USING ADVERSARIAL NEURAL NETWORK TRAINING

(71) Applicant: Adobe Inc., San Jose, CA (US)

(72) Inventors: Yang Liu, Cambridge (GB); Zhaowen Wang, San Jose, CA (US); Hailin Jin, San Jose, CA (US)

(73) Assignee: ADOBE INC., San Jose, CA (US)

( * ) Notice: Subject to any disclaimer, the term of this patent is extended or adjusted under 35 U.S.C. 154(b) by 231 days.

(21) Appl. No.: 15/807,028

(22) Filed: Nov. 8, 2017

(65) Prior Publication Data

US 2019/0138860 A1     May 9, 2019

(51) Int. Cl.
| | | |
|---|---|---|
| *G06K 9/68* | (2006.01) | |
| *G06K 9/62* | (2006.01) | |
| *G06K 9/00* | (2006.01) | |
| *G06N 3/04* | (2006.01) | |
| *G06N 3/08* | (2006.01) | |
| *G06K 9/66* | (2006.01) | |

(52) U.S. Cl.
CPC ....... *G06K 9/6828* (2013.01); *G06K 9/00422* (2013.01); *G06K 9/6256* (2013.01); *G06K 9/6273* (2013.01); *G06K 9/6277* (2013.01); *G06K 9/66* (2013.01); *G06N 3/0454* (2013.01); *G06N 3/0472* (2013.01); *G06N 3/084* (2013.01); *G06K 2209/011* (2013.01)

(58) Field of Classification Search
CPC .... G06N 3/0454; G06N 3/0472; G06N 3/084; G06K 9/6828; G06K 9/66; G06K 9/6277; G06K 9/6256; G06K 9/00422; G06K 9/6273; G06K 2209/011
See application file for complete search history.

(56) References Cited

U.S. PATENT DOCUMENTS

| | | | | |
|---|---|---|---|---|
| 2005/0259866 | A1* | 11/2005 | Jacobs | ............... G06K 9/00463 382/157 |
| 2016/0307347 | A1* | 10/2016 | Matteson | ............... G06F 17/214 |
| 2019/0130232 | A1* | 5/2019 | Kaasila | ................... G06N 20/00 |

OTHER PUBLICATIONS

Goodfellow, Ian, et al. "Generative adversarial nets." Advances in neural information processing systems 27 (NIPS) 2014.
Radford, Alec, Luke Metz, and Soumith Chintala. "Unsupervised representation learning with deep convolutional generative adversarial networks." arXiv preprint arXiv:1511.06434 (2015).
Schmidhuber, Jürgen. "Learning factorial codes by predictability minimization." Neural Computation 4.6 (1992): 863-879.

* cited by examiner

*Primary Examiner* — Yon J Couso
(74) *Attorney, Agent, or Firm* — Keller Jolley Preece

(57) ABSTRACT

The present disclosure relates to a font recognition system that employs a multi-task learning framework and adversarial training to improve font classification and remove negative side effects caused by intra-class variances of glyph content. For example, in one or more embodiments, the font recognition system adversarial trains a font recognition neural network by minimizing font classification loss while at the same time maximizing glyph classification loss. By employing an adversarially trained font classification neural network, the font recognition system can improve overall font recognition by removing the negative side effects from diverse glyph content.

20 Claims, 13 Drawing Sheets

FONT RECOGNITION USING ADVERSARIAL NEURAL NETWORK TRAINING

BACKGROUND

Recent years have seen a rapid proliferation in the use of computing devices in the area of digital typography with respect to creating and editing electronic documents. Indeed, it is now commonplace for individuals and businesses to use digital typography to create customized webpages, e-mails, magazines, marketing materials, and other electronic documents utilizing desktop computers, laptop computers, mobile devices, tablets, smartphones, or other computing devices.

Digital typography includes the use of digital fonts. Recent years have also seen an increase in the type and variety of digital fonts utilized in electronic documents. For example, an electronic document can use digital fonts selected from a collection of thousands of digital fonts. Further, individuals can effortlessly find, access, and install additional digital fonts on a computing device to be used for creating electronic documents.

A major challenge that has arisen with the increase in the number of digital fonts is the capability to correctly detect and recognize digital fonts. For example, an individual sees a font in a document or image and desires to use the same font in an electronic document. As such, the font in the document or image must be correctly identified before the user can use it as a digital font. In general, the ability to detect and recognize digital fonts can greatly enhance an individual's experience when creating and editing electronic documents.

While some recent font classification systems have been developed to recognize fonts using machine-learning algorithms, these recent font classification systems still struggle in the area of intra-class variances within a class of digital fonts (e.g., variations between glyphs of the same font). While this problem exists with respect to glyphs (e.g., unique symbols that make up words) that use the Roman alphabet, the magnitude of the problem increases with other languages. To demonstrate, the Roman alphabet uses 26 different glyphs while Japanese writing includes over 50,000 glyphs. Other languages also include thousands of glyphs.

As the number of glyphs increase, such as in the case of Japanese fonts, the number of intra-class variances within the glyph content likewise increases. In many cases, due to the number of glyphs, recent font classification systems do not properly see or consider each of the potential glyphs when training, which then leads to inaccurate results. As another issue, particularly with Japanese Fonts, the visual difference between different Japanese writing types (e.g., Kanji and Kana) is significant and requires additional training samples to correctly recognize and classify fonts. In sum, even recent font classification systems fail to provide the level of generalization and accuracy needed to correctly identify Japanese fonts.

In addition, recent font classification systems that employ machine-learning algorithms to classify fonts require large amounts of memory and computational requirements. In particular, recent font classification systems require additional memory, processing resources, and time to converge a neural network to identify accurate font feature vectors and font probability vectors. In addition, due to the additional requirements, recent font classification systems are often unstable. Further, because of these requirements, client devices, particularly mobile ones, cannot execute these neural networks.

These and other problems exist with regard to detecting and classifying digital fonts, and Japanese fonts in particular, using existing systems and methods.

SUMMARY

Embodiments of the present disclosure provide benefits and/or solve one or more of the foregoing or other problems in the art with systems, computer media, and methods for effectively recognizing digital fonts (or simply "fonts") using adversarial training and deep learning techniques. For example, the disclosed systems adversarial train a font recognition neural network by minimizing font classification loss while at the same time maximizing a glyph classification loss. By employing an adversarially trained font classification neural network, the disclosed systems can remove the negative side effects caused by intra-class variances of glyph content, and thus, improve font classification.

More particularly, the disclosed systems generate a font recognition neural network configured to classify fonts. The disclosed systems further train the font recognition neural network using adversarial training to learn discriminative features that are effective at differentiating fonts but are ineffective at differentiating glyphs. In some embodiments, adversarially training the font recognition neural network includes minimizing cross-entropy loss for a font classifier while maximizing cross-entropy loss for a glyph classifier.

Once trained, the font recognition neural network can receive an input text image that includes an input font. In response, the adversarially trained font recognition neural network determines a font probability vector for the input font. Further, the disclosed systems identify the input font based on the font probability vector.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
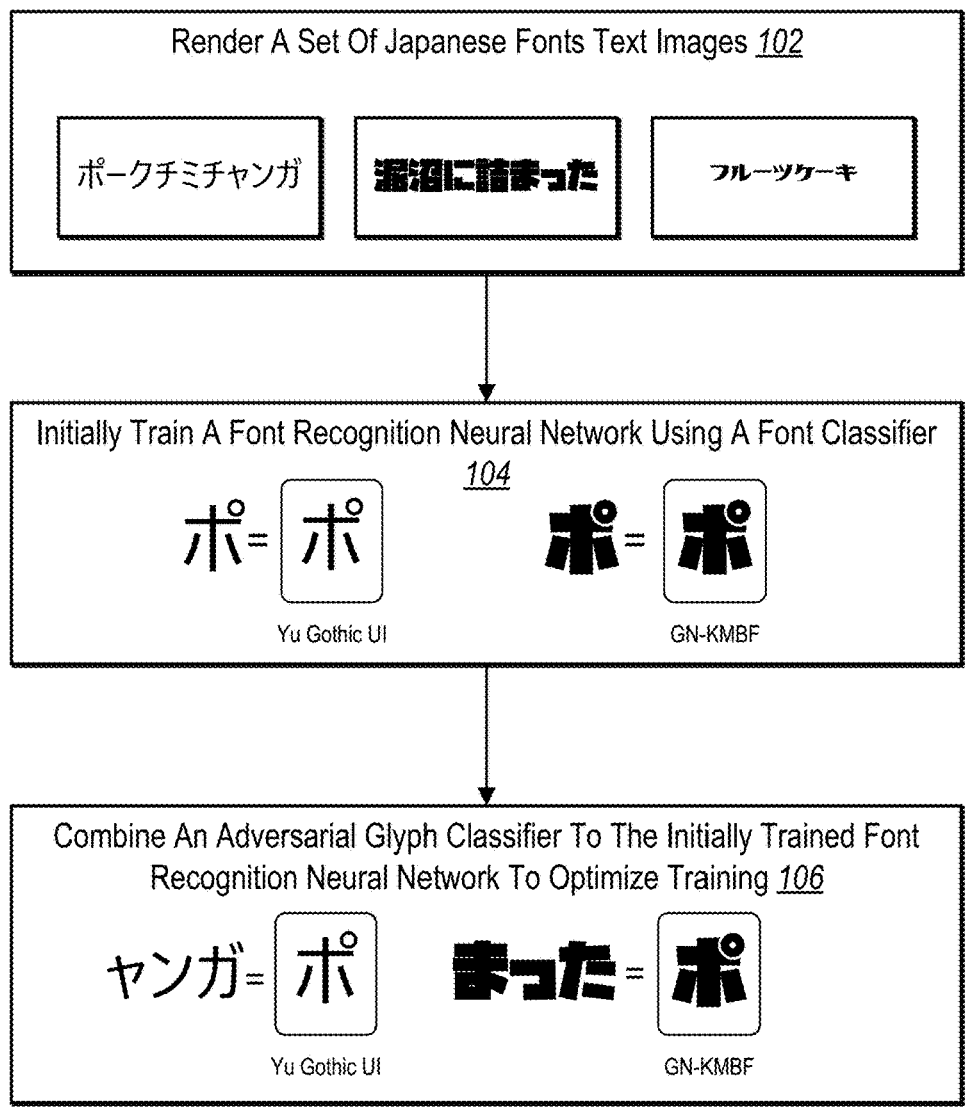
FIG. 1 illustrates a diagram of a general process for adversarially training a font recognition neural network in accordance with one or more embodiments.

This disclosure describes one or more embodiments of a font recognition system that employs adversarial training to improve font classification and remove negative side effects caused intra-class variances of glyph content. In particular, the font recognition system adversarially trains a font recognition neural network using a font classifier and an adversarial glyph classifier to improve overall font recognition by removing the negative side effects from diverse glyph content.

To illustrate, in one or more embodiments, the font recognition system generates a font recognition neural network configured to classify fonts from rendered text images in a training font set. For instance, the font recognition system uses a font classifier to recognize fonts based on features extracted from the text images in the training font set. In addition, the font recognition system can further train the font recognition neural network by adding a glyph classifier, which is designed to recognize glyphs based on the extracted features. However, rather than training the font recognition neural network to recognize glyphs in the text images, the font recognition system uses the glyph classifier to make the font recognition neural network indifferent to glyphs (e.g., glyph agnostic). For instance, the font recognition system employs the glyph classifier to adversarially compete with the font classifier during training. In this manner, the font recognition system trains a font recognition neural network that generates feature vectors that is effective at differentiating fonts without side effects from glyphs.

In one or more embodiments, the font recognition neural network is a convolutional neural network that includes convolutional layers (e.g., lower neural network layers) and fully-connected layers (e.g., higher neural network layers). In some embodiments, the convolutional layers form an encoder that generates font feature vectors by using tunable (e.g., learned) parameters to extract font features from text images. The fully-connected layers of the initially trained font recognition neural network can include a font classifier that recognizes a font based on the font feature vectors from the encoder. During training, a font classification loss model identifies when the font classifier misclassifies a text image from the training font set, and provides feedback to the encoder and/or font classifier, which modifies or tunes the feature extraction parameters to better classify fonts.

As also mentioned above, the font recognition system can improve the font recognition neural network's ability to recognize fonts, particularly for fonts that exhibit intra-class variances with glyph content, by further training the font recognition neural network using an adversarial glyph classifier. For example, the font recognition system adds an additional set of fully-connected layers that form a glyph classifier. For instance, the set of fully-connected layers of the font classifier stack with the fully-connected layers of the glyph classifier. As stated earlier, the glyph classifier identifies glyphs based on the font feature vectors from the encoder. However, the font recognition system further trains the font recognition neural network by having the encoder and font classifier compete against the glyph classifier such that the encoder produces font feature vectors that are good for font recognition (i.e., the font classifier) and poor for glyph recognition. (i.e., the glyph classifier).

To illustrate, the glyph classifier classifies a font feature vector generated by the encoder as a particular glyph, where the font feature vector corresponds to a given text image (e.g., a text image in the training font set). If the particular glyph correctly matches a glyph in the given text image, the font recognition system provides feedback to the encoder to modify or tune the extraction parameters until the glyph classifier begins to misclassify the glyph. Periodically, when the glyph classifier misclassifies the glyph in a text image during training, the font recognition system alternatively provides feedback to the glyph classifier, which enables the glyph classifier to tune glyph classification parameters and remain a competitive adversary to the encoder/font classifier. Overall, the font recognition system trains the font recognition neural network using a minimax objective function that minimizes cross-entropy loss for the font classifier while maximizing cross-entropy loss for the glyph classifier.

As mentioned, the font recognition system can provide feedback to parts of the font recognition neural network during training. Indeed, the font recognition system employs back propagation and end-to-end learning to provide feedback and train the font recognition neural network. In various embodiments, the font recognition system provides feedback sequentially. For example, the font recognition system first iteratively updates the parameters in the encoder until the error loss in the glyph classifier exceeds a predetermined threshold. Upon exceeding the threshold, the font recognition system updates the parameters in the font classifier and then the glyph classifier, or vice versa, for a fixed number of iterations. The font recognition system can repeat the acts of providing feedback and sequentially updating parameters at the encoder, font classifier, and glyph classifier using a training font set until the font recognition neural network converges through the adversarial training.

Additionally, in one or more embodiments, the font recognition system introduces random deviations into the text images in the training font set. For example, the font recognition system randomly introduces a small amount of Gaussian noise, blur, or shading to various text images. In addition, the font recognition system rotates the perspective of randomly selected text images. By adding random deviations, the font recognition system can improve the robustness of the font recognition neural network by making training more challenging, and thus, making the trained font recognition neural network more discriminative (e.g., more selective) with generating font feature vectors.

The font recognition system uses the adversarially trained font recognition neural network to identify the font in input images. For example, in various embodiments, the font recognition system receives an input text image that includes an input font. Upon receiving the input text image, the font recognition system determines one or more font probability vectors for the input font using the adversarially trained font recognition neural network. Further, the font recognition system identifies the input font based on the determined font probability vectors.

Specifically, in various embodiments, the font recognition system employs the adversarially trained font recognition neural network (e.g., the trained encoder) to determine a font prediction vector for the input text image. Based on the font probability, the font recognition system employs the trained font classifier to identify the font used in the input text image. For instance, the font probability vector indicates a matching probability between the input font and each font in a set of known fonts, such that the font recognition system identifies the input font as the known font having the highest matching probability within the font probability vector. The font recognition system can identify known fonts with the next highest matching probabilities as similar fonts (e.g., top five matching fonts).

As previously mentioned, the font recognition system provides numerous advantages and benefits over conventional systems and methods. As an example, the font recognition system trains and identifies fonts that traditionally suffer from negative side effects caused by intra-class variances of glyph content (e.g., Japanese fonts). In particular, by employing the glyph classifier/glyph classification loss model in connection with the font classifier/font classification loss model, the font recognition system adversarially trains a font recognition neural network to remove the side effects of intra-class variances of glyph content.

Further, as another example, in many embodiments, the font recognition system provides increased flexibility over known systems by accurately identifying text in input images not included in the training font set. In particular, as a result of removing the negative side effects caused by glyph content through adversarial training, the adversarially trained font recognition neural network becomes more generalized, which enables the font recognition system to accurately identify the font of glyphs unseen in the training stage. This is particularly advantageous when working with languages that have a large variety and number of possible glyphs (e.g., over 50,000 glyphs in the Japanese language) as the training font set may only include a small percentage (e.g., ~1%) of possible glyphs.

As further described below, the font recognition system outperforms state-of-the-art font classifications systems in head-to-head evaluations with respect to accurately identifying fonts from text images not included in a training font set. Indeed, the font recognition system provides a more generalized ability to recognize fonts as well as produce accurate results. Additional results of testing and evaluating the font recognition system are described below with respect to FIG. 7 and FIG. 8.

As a further benefit, the font recognition system reduces memory needs and computational requirements over known systems. For example, the font recognition system reduces the overall training time of a font classification network by employing adversarial training. Stated differently, for a state-of-the-art font classifications system to achieve the same level of accuracy as the font recognition system disclosed herein, the system would require additional training iterations, a significantly larger amount of training font data, and/or memory storage as well as additional time to converge a neural network to achieve comparable results as the font recognition system disclosed herein. Further, even with the increased time and resources, a state-of-the-art font classifications system would not produce a font recognition neural network that is as robust and stable as one or more embodiments described herein.

Additional advantages and benefits of the font recognition system will become apparent in view of the below description. In particular, one or more embodiments of the font recognition system will be described below with reference to one or more figures. In addition, the following definitions of terms will be used to describe one or more features of the font recognition system.

As used herein, the term "text image" refers to any type of electronic document or file that includes written text (i.e., glyph content) in one or more digital fonts. For example, a text image can include an electronic document in the form of an image file (permanent or temporary), a clipboard file, a word-processing document, a portable document file (PDF), an e-mail file, a text file, a web page, or any other electronic file. A text image can originate from a physical source, such as an advertisement, brochure, flyer, book, magazine, periodical, or other publication.

As used herein, the term "digital font" (or simply "font") refers to a defined set of digital characters (e.g., glyphs). In particular, the term "font" includes a collection of digital characters of a particular style or typeface. A font includes digital files with the extensions, such as, but not limited to: .ttf, .otf, .fnt, .abf, .ttc, .suit, .woff, .vnf, .t65, .sfp, .sad, .pmt, .pfm, .pfb, .pfa, .odtff, .mf, .gdr, .fon, .fnt, .font, .etx, .eot, .compositefont, .acfm, .afm, or .amfm. For example, the term digital font includes fonts entitled Times New Roman, Helvetica, Arial, PT Sans Regular, Corbel, or other font titles.

A font can be represented by a font feature vector. As used herein, the term "font feature vector" (or simply "feature vector") refers to a vector of numeric values representing characteristics and attributes of a font. In particular, the term "feature vector" includes a set of values corresponding to latent and/or patent attributes and characteristics of a font. In one or more embodiments, a feature vector is a multi-dimensional dataset that represents a font. In one or more embodiments, a feature vector includes a set of numeric metrics learned by a machine-learning algorithm such as a neural network. For example, a feature vector can include font glyph data, such as glyph curvature, glyph spacing, glyph size, glyph shape, glyph width, glyph height, glyph location (e.g., glyph location in relation to a baseline), glyph area, glyph orientation, number of curves per glyph, arc length, glyph contrast, and font classification features (e.g., font features utilized to classify a font). Further, a feature vector can provide numeric values for the font class and font characteristics of a font. In some embodiments, the term feature vector and feature representation are used interchangeably as a feature vector is an example of a feature representation.

As described above, feature vectors can provide a numerical representation of a font classification (i.e., font class), and font characteristics. As used herein, the term "font classification" refers to a font category and/or font name and can include pre-defined categories utilized to classify digital fonts. For instance, font classifications include font classes (i.e., Serif, Sans Serif, Slab Serif, Script, Blackletter, Mono, Hand, or Decorative). In some embodiments, the term "font characteristic," also refers to attributes corresponding to a font, such as style (e.g., regular, bold, italic, shadowed, underlined, strikethrough, subscript, or superscript), weights (e.g., light, regular, and heavy weights), widths (e.g., condensed, regular, and extended widths), capitalization styles (e.g., all caps, small caps, title case, and sentence case), x-heights (e.g., small, regular and large x-heights), and contrasts (e.g., low, regular, and high contrasts).

The term "font probability vector" corresponds to a set of values that provide a correlation between an input font and known fonts. In particular, the term "font probability vector" includes an n-dimensional vector where n corresponds to a number of known fonts. For each of the n known fonts, the font probability vector includes a matching probability that the input font matches the known font. In some cases, a font classifier generates a font probability vector by comparing (e.g., based on vector space distance) the feature vector generated for an input font to feature vectors of each known font to determine the matching probability between the input font and the known font.

Similarly, the term "glyph probability vector" corresponds to a set of values that provide a correlation between an input glyphs and known glyphs. In particular, the term "glyph probability vector" includes an m-dimensional vector where m corresponds to a number of known glyph. In some cases, a glyph classifier generates a glyph probability vector by comparing (e.g., based on vector space distance) the feature vector generated for an input glyph to feature vectors of each known glyph to determine the matching probability between the input glyph and the known glyph.

The term "machine learning," as used herein, refers to the process of constructing and implementing algorithms that can learn from and make predictions on data. In general, machine learning may operate by building models from example inputs (e.g., training), such as a training font set, to make data-driven predictions or decisions. In some example embodiments, machine learning is used for data mining, and statistical pattern recognition, such as collaborative feature learning, or learning features from a training font set.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes one or more machine learning algorithms. In particular, the term neural network can include deep convolutional neural networks (i.e., "CNNs"). In addition, a neural network is an algorithm (or set of algorithms) that implements deep learning techniques that utilize a set of algorithms to model high-level abstractions in data. As used herein, a neural network refers to a neural network having a regression loss model in the loss layer (e.g., a font classification loss model or a triplet loss model). The description and figures below generally refer to a CNN.

As used herein, the term "adversarial learning" refers to a machine-learning algorithm where opposing learning models are solved together. In particular, the term "adversarial learning" includes solving a plurality of learning tasks in the same model (e.g., in sequence or in parallel) while utilizing the roles and constraints across the tasks. In some embodiments, adversarial learning includes employing a minimax function (e.g., a minimax objective function) that both minimizes a first type of loss and maximizes a second type of loss. For example, the font recognition system employs adversarial learning to minimize cross-entropy loss to the font classifier while also maximizing cross-entropy loss to the glyph classifier as part of a joint learning framework.

As used herein, the term "loss function" or "loss model" refers to a function that indicates loss errors between feature vectors and/or probability vectors in multi-dimensional vector space. A machine-learning algorithm (e.g., neural network) can repetitively train to minimize and/or maximize error loss. In some embodiments, the font recognition system employs multiple classification loss functions, where some loss functions are minimized while other loss functions are maximized. An example of a loss function includes a font classification loss, which uses a softmax font classifier with cross-entropy loss. Another example of a loss function includes a glyph classification loss, which uses a softmax glyph classifier with cross-entropy loss. Both font classification loss and glyph classification loss are further described below.

Referring now to the figures, FIG. 1 illustrates a diagram of a general process 100 for adversarially training a font recognition neural network. For instance, in various embodiments, a font recognition system implements the process 100 to fully train a font recognition neural network. The font recognition system can be implemented by one or more client devices, such as one or more server devices, one or more client devices, or a combination of server devices and client devices.

As an initial matter, the figures describe the font recognition system with respect to Japanese fonts and glyphs. One will appreciate that the techniques, operations, methods, and actions described with respect to the font recognition system and the figures apply to other types of fonts and glyphs. The font recognition system is particularly advantageous when used with fonts that suffer from negative side effects of intra-class variances of glyph content.

As shown in FIG. 1, the font recognition system renders 102 a set of Japanese font text images. For instance, the font recognition system generates a training font set of text images that includes various Japanese glyphs and Japanese fonts. The font recognition system can generate millions of text images as part of a training font set. Additional description regarding rendering text images is provided below with respect to FIG. 2A.

Upon rendering the set of Japanese font text images, the font recognition system initially trains 104 a font recognition neural network using a font classifier. For example, in one or more embodiments, the font recognition system initially trains a font recognition neural network that employs a font classification to determine tunable font feature extractions parameters based on the text images. In some embodiments, the font recognition neural network is a convolutional neural network where the lower convolutional layers form an encoder and the higher fully-connected layers from the font classifier. For example, the encoder generates font feature vectors using the tunable feature parameters. Next, the font classifier classifies the fonts based on the feature vectors and provides a font probability vector to a font classifier loss model, which in turn, provides feedback to the encoder and/or font classifier. A detailed example of the initially trained font recognition neural network is provided in FIG. 2A, described below.

The initially trained font recognition neural network can be regarded as the initialization phase of training a fully-trained font recognition neural network. For example, the initially trained font recognition neural network includes spatial relationships between the various text images in the set of Japanese font text images (e.g., the training font set). However, because Japanese fonts exhibit intra-class variances, the initially trained font recognition neural network may improperly map the spatial relationships between corresponding feature vectors. For instance, while the initially trained font recognition neural network may accurately identify the font for glyphs seen in the Japanese font text images, the initially trained font recognition neural network may regularly misclassify the font of glyphs not included in the Japanese font text images. A training font set of 500 glyphs includes approximately 1% of the total available Japanese glyphs.

Figure 2A:
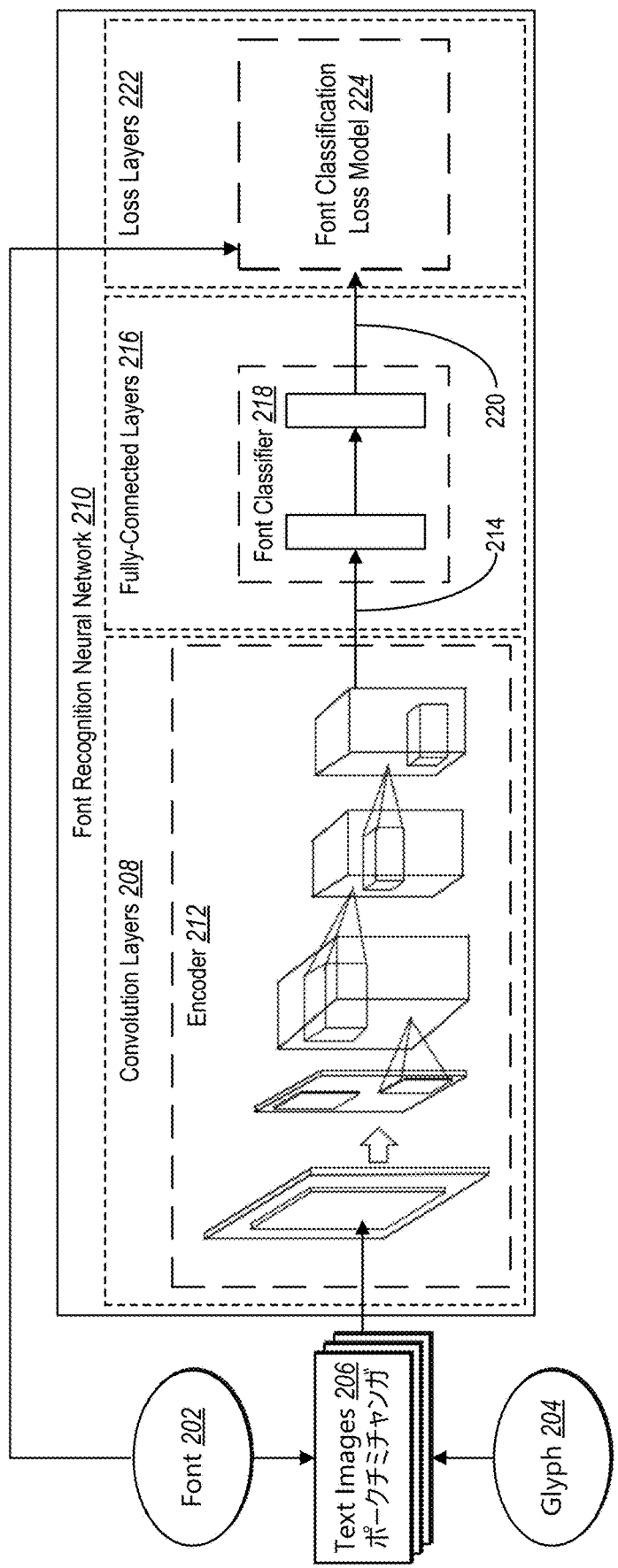
FIGS. 2A and 2B illustrate a diagram of a more detailed process for adversarially training the font recognition neural network using a training font set, a font classifier, and a glyph classifier in accordance with one or more embodiments.
Figure 2B:
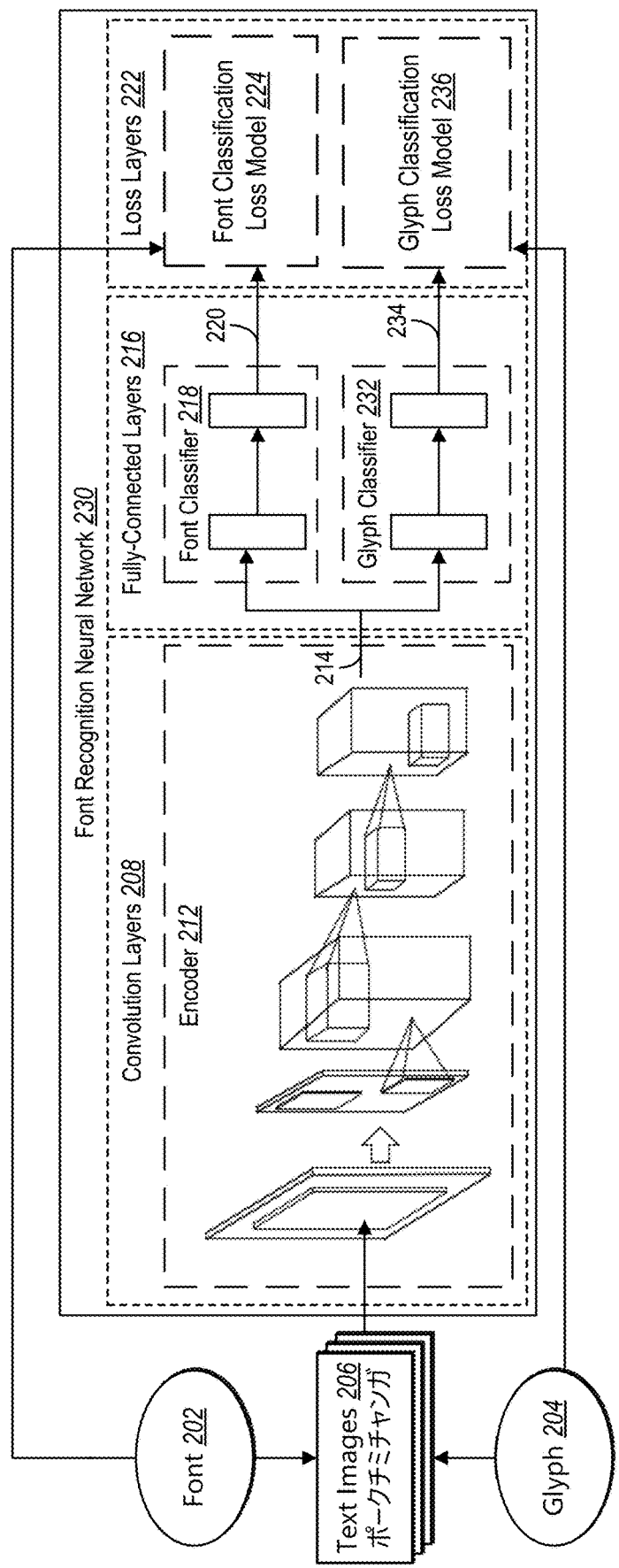

To remedy the intra-class variance issues, the font recognition system can add a glyph classifier to the initially trained font recognition neural network to significantly improve the training of the font recognition neural network. To illustrate, FIG. 1 shows the font recognition system combining 106 an adversarial glyph classifier to the initially trained font recognition neural network to optimize training. In one or more embodiments, the adversarial glyph classifier employs a glyph classifier with tunable glyph feature parameters. Further, the glyph classifier can output glyph probability vectors to a glyph classification loss model to refine the encoder and/or glyph classifier. In many embodiments, the font recognition system stacks the glyph classifier above (or below) the font classifier in the higher fully-connected layers of the neural network. FIG. 2B, described below, provides a detailed example of adversarially training the font recognition neural network by adding the glyph classifier.

By adding a glyph classifier and using adversarial training, the font recognition system can significantly reduce, if not entirely remove, the negative side effects of intra-class variances among glyph content with respect to the Japanese fonts. As further described below, the font recognition system trains the font recognition neural network by having the font classifier compete against the glyph classifier to improve font recognition irrespective of the glyphs used. Accordingly, the adversarially trained font recognition neural network can accurately recognize the font used in an input text image regardless of if the input text image includes glyphs previously seen in the training font set.

Figure 2C:
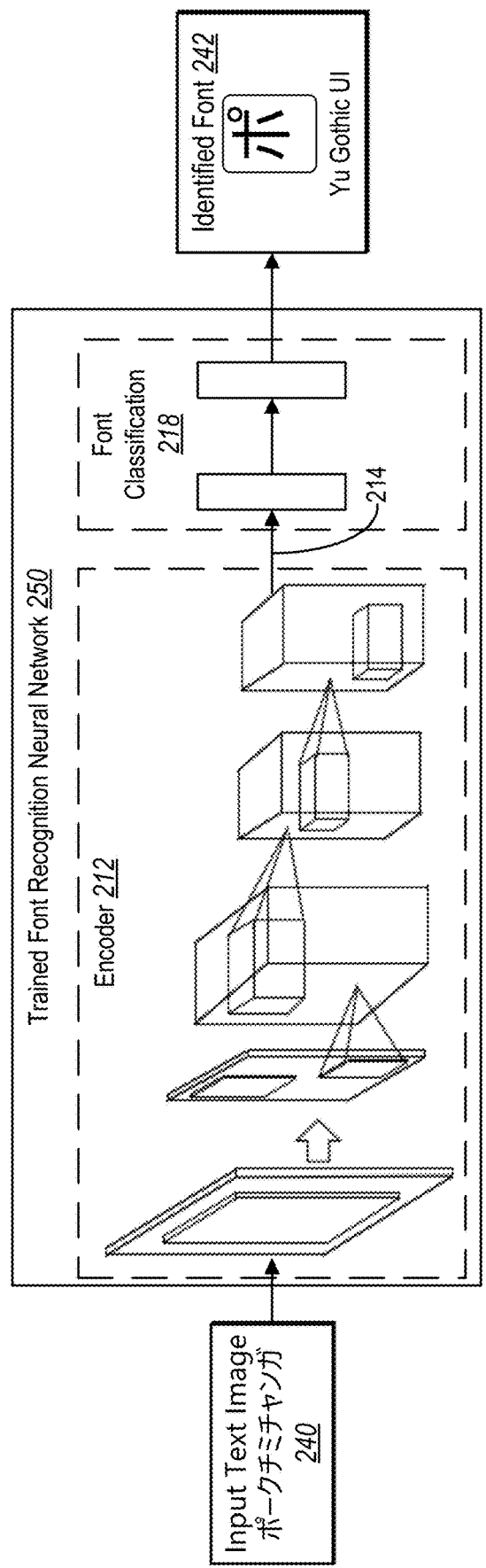
FIG. 2C illustrates a diagram of employing a trained font recognition neural network to identify a font within an input text image in accordance with one or more embodiments.

As mentioned above, FIGS. 2A and 2B illustrate a diagram of a more detailed process for adversarially training the font recognition neural network. In particular, FIG. 2A shows initially training a font recognition neural network 210 using a font classifier and a font classification loss model. FIG. 2B shows a fully-training the font recognition neural network 230 by adding a glyph classifier and a glyph classification loss model. FIG. 2C illustrates employing the trained font recognition neural network 250 to identify the font in an input text image.

As just mentioned, FIG. 2A includes a font recognition neural network 210 trained using text images 206. In one or more embodiments, the font recognition neural network is 210 a deep learning convolutional neural network that includes lower neural network layers and higher neural network layers. In particular, the lower neural network layers are convolutional layers 208 that include an encoder 212 and the higher neural network layers are fully-connected layers 216 that include a font classifier 218. In addition, during training, the font recognition neural network includes loss layers 222 having a font classification loss model 224.

As mentioned above, the font recognition system can render or otherwise obtain text images 206. For instance, the font recognition system randomly pairs a font 202 (e.g., a Japanese font) with one or more glyphs 204 (e.g., Japanese glyphs) to render a large number of text images 206 (e.g., Japanese font text images). In some embodiments, the font recognition system renders millions of text images 206 that display the random glyphs/font combination. The rendered text images can form a training font set used to train the font recognition neural network 210 as further described below.

More specifically, in one or more embodiments, the font recognition system renders the text images based on a set of glyphs and a set of fonts. To illustrate, the font recognition system randomly selects a glyph 204. In some instances, the font recognition system selects the glyph 204 from a subset of Japanese glyphs, such as the 500 most used Japanese glyphs, the top 25% most used Japanese glyphs, 10,000 randomly selected Japanese glyphs, or another subset number of Japanese glyphs. Note, for simplicity in explanation, selection of a single glyph is described, however, the font recognition system can likewise select multiple glyphs that form a text string.

For the selected glyph 204, the font recognition system selects a font 202 in which to write the glyph 204. For example, the font recognition system chooses one of 600 Japanese fonts in which to write the glyph 204. Upon writing the selected glyph 204 in the selected font 202, the font recognition system renders the written glyph as a text image and adds the rendered text image to the set of text images 206. In addition, the font recognition system can label, annotate, or otherwise tag the rendered text image with the glyph 204 and font 202 shown in the rendered text image.

In alternative, or additional, embodiments, the font recognition system obtains a training font set of Japanese font text images. For example, the font recognition system previously created a training font set of Japanese font text images, which is stored in a font database, either locally or remotely. In another example, the font recognition system obtains a training font set of Japanese font text images from a third-party font repository. The font recognition system can combine one or more training font sets with newly rendered Japanese font text images.

In various embodiments, the font recognition system randomly introduces deviations into the text images 206 in the training font set. For example, the font recognition system randomly introduces noise (e.g., a small Gaussian noise with zero mean and a standard deviation of three), blur (e.g., a random Gaussian blur with standard deviation between two and four), perspective rotation (e.g., a randomly-parameterized affine transformation), and/or shading (e.g., random gradients that fill the input background) into some of the text images 206. In addition, the font recognition system can add variable character spacing and/or variable aspect ratio modifications to the text images 206. These deviations add robustness while training the font recognition neural network 210 as well as enable the trained font recognition neural network to better recognize real-world text images.

As mentioned above, the font recognition system provides the text images 206 as input to initially train the font recognition neural network 210. For instance, the font recognition system trains the encoder 212 to generate feature vectors 214 for fonts in the text images 206, the font classifier 218 to identify the fonts based on the feature vectors 214, and the font classification loss model 224 to determine the accuracy of the font classifier 218 by comparing the fonts (e.g., the font 202) in the text images to corresponding fonts identified by the font classifier 218.

As explained above, the font classifier 218 determines a font probability vector 220 based on analyzing a feature vector generated by the encoder 212. In one or more embodiments, the encoder 212 includes one or more normalizing and pooling layers to generate the feature vectors 214. In alternative embodiments, the font recognition system employs different types of lower neural network layers to encode the feature vectors 214.

Further, in some embodiments, the font classifier 218 determines a font probability vector 220. For example, if 600 fonts are used in the text images 206 (e.g., the font 202 is one of 600 Japanese fonts), the font classifier 218 outputs a 600-dimensional font probability vector 220 with entries ranging between zero and one (i.e., [0-1]). In some embodiments, the font recognition system can store each feature vector as part of the font recognition neural network 210 (e.g., in a font feature space).

In addition, the font recognition system can provide the font probability vector 220 to the font classification loss model to determine the accuracy and/or error loss of the font classification. In some embodiments, the font classification loss model 224 employs a softmax cross-entropy loss font classifier and/or mean square error computations to determine the amount of font classification loss. For instance, the font classification loss model 224 identifies when a font probability vector 220 is beyond a threshold distance from font features corresponding to the font 202 within the learned feature space, and/or how far beyond the threshold distance (e.g., error loss) the font probability vector 220 is from the font 202.

Using the error loss to train and optimize the neural network layers of the font recognition neural network 210, the font recognition system can employ back propagation to tune feature parameters within layers of the font recognition neural network 230. For instance, in one or more embodiments, the font recognition system takes the error loss output from the font classification loss model 224 and provides it back to the convolutional layers 208 and/or the fully-connected layers 216 until the error loss from the font classification loss model 224 is minimized.

More specifically, in one or more embodiments, the font classification loss model 224 provides feedback to the encoder 212 and font classifier 218 via back propagation. For example, when the font classification loss model 224 determines that the font classifier 218 misclassified the font in a text image, the font classification loss model 224 provides feedback to the encoder 212. In response, the encoder 212 modifies or tunes the font feature parameters such that generated feature vectors 214 more accurately represent fonts in the text images 206. The font classification loss model 224 can also provide feedback to the font classifier to tune font classification parameters to better classify fonts based on feature vectors 214 outputted from the encoder 212. In this manner, the font recognition system iteratively trains the font recognition neural network 210 to learn a set of best-fit parameters.

As mentioned above, the initially trained font recognition neural network 210 can identify a font in an input text image of a Japanese font. However, the initially trained font recognition neural network 210 by itself may not produce accurate results for many types of fonts, such as Japanese fonts, which exhibit intra-class variances from diverse glyph content. For example, the initially trained font recognition neural network 210 will likely misidentify the font in an input text image if the text image includes one or more of glyphs not seen in training.

To improve recognition accuracy and increase font generalization, the font recognition system further trains the font recognition neural network 210 using an adversarial glyph classifier. As shown in FIG. 2B, the font recognition system adds the glyph classifier 232 in the fully-connected layers 216 of the font recognition neural network 230. In one or more embodiments, the glyph classifier 232 is stacked in parallel with the font classifier 218. In alternative embodiments, the glyph classifier 232 is placed before or after the font classifier 218 within the fully-connected layers 216. As mentioned above, adding the glyph classifier 232 enables the font recognition system to adversarially train the font recognition neural network 230 to extract font features that are not subject to, or less subject to, the negative side effects of Japanese glyphs (i.e., intra-class variances.

As FIG. 2B illustrates, the encoder 212 in the convolutional layers 208 generates feature vectors 214 as output, which are provided to both the font classifier 218 and the glyph classifier 232. Like the font classifier 218 that generates a font probability vector 220, the glyph classifier glyph classifier generates a glyph probability vector 234. For example, if the font recognition system rendered the training font set from a subset of 500 glyphs, the glyph classifier 232 generates a 500-dimensional glyph probability vector with entries ranging between zero and one (i.e., [0-1]).

As shown, the font recognition system also adds a glyph classification loss model 236 to the loss layers 222 to further train the font recognition neural network 230. In one or more embodiments, the glyph classification loss model 236 employs a softmax cross-entropy loss glyph classifier and/or mean square error computations to determine the amount of glyph classification loss. As with the font classification loss, the font recognition system can measure the amount of glyph error loss and provide the error loss to layers of the font recognition neural network 230 to further train and optimize the font recognition neural network 230.

To illustrate, the glyph classification loss model 236 measures the distance between the glyph probability vector 234 generated by the glyph classifier 232 and the glyph 204 used in a corresponding text image to determine the accuracy and/or amount of error loss of the glyph classifier 232. For example, in one or more embodiments, the glyph classification loss model 236 identifies when a glyph probability vector 234 is beyond a threshold distance from glyph features corresponding to the glyph 204 within the learned feature space and/or how far beyond the threshold distance (e.g., glyph error loss) the glyph probability vector 234 is from the glyph 204. The glyph classification loss model 236 provides the measured glyph loss back to the encoder 212 and/or the glyph classifier 232.

Generally, a recognition system attempts to increase recognition accuracy and minimize error loss. For example, the font recognition system attempts to minimize font classifier loss. However, because the font recognition system is employing the glyph classifier 232 in an adversarial manner, the font recognition system actually seeks to maximize glyph classification loss. Accordingly, the font recognition system employs a minimax objective function that minimizes font classification loss while at the same time maximizing glyph classification loss.

As a conceptual example of the minimax objective function, consider the glyph classifier 232 competing in a game with the encoder 212. The encoder 212 wins a point when the encoder 212 produces a feature vector that misleads the glyph classifier 232 (e.g., the glyph classifier 232 misclassifies the glyph). Conversely, the glyph classifier 232 wins a point when it properly classifies a glyph based on the feature vector generated by the encoder 212. If the glyph classifier 232 scores a threshold number of points beyond the points of the encoder 212, the font recognition system tunes parameters of the encoder 212 to better mislead the glyph classifier 232. Likewise, if the encoder 212 starts pulling away from the glyph classifier 232 in scored points, the font recognition system trains up the glyph classifier 232 to better classify glyphs, which keeps the game competitive. While the encoder 212 and glyph classifier 232 remain equally matched in strength, the font recognition system can continue to adversarially train the font recognition neural network 230.

By employing the minimax objective function, the font recognition system trains the font recognition neural network 230 to accurately identify fonts in the text images 206 while purposefully losing sensitivity to intra-class variances caused by glyph content. In some embodiments, the font classification loss model 224 and the glyph classification loss model 236 provide their respective classification losses to a combined classification loss model, which embodies the minimax objective function (e.g., $L_{Total}=\min(L_{Font})+\max(L_{Glyph})$, where L represents classification loss). Additional detail regarding the minimax objective function is provided with respect to FIG. 4 below.

In one or more embodiments, the font recognition system provides sequential feedback to the encoder 212, the font classifier 218, and the glyph classifier 232. Indeed, because the encoder 212 and the font classifier 218 compete against the glyph classifier 232 during training, providing simultaneous optimization through feedback is a difficult task. For example, the font recognition system first optimizes the encoder 212, then the font classifier 218, and then the glyph classifier 232. Additional detail regarding optimizing feedback of the font recognition neural network 230 is described below in connection with FIG. 3.

The font recognition neural network 230 can iteratively repeat the overall feedback and optimization cycle until the font recognition neural network 230 is trained. For instance, the font recognition neural network 230 continues to feed the text images 206 and optimize the layers of the font recognition neural network 230 until the neural network converges. Thus, in various embodiments, the font recognition neural network 230 is trained when the combined classification losses reach minimax stabilization levels.

Overall, by providing feedback through back propagation, the font recognition system can adversarially train the font recognition neural network 230 in an end-to-end manner. Accordingly, the font recognition system can enable the font recognition neural network 230 to quickly converge to an accurate and stable learned state. Indeed, because adding the glyph classifier 232 during training reduces or eliminates intra-class variances among glyph content with respect to font classification, the font recognition system quickly learns feature vectors for Japanese (or other) fonts that accurately identify the font for an input text image, even if the input text image includes glyphs not seen during training.

To further illustrate, FIG. 2C shows a diagram of employing the trained font recognition neural network 250 to identify a font based on an input text image 240 in accordance with one or more embodiments. In particular, FIG. 2C shows the font recognition system determining an identified font 242 for text in an input text image 240 using the encoder 212 and the font classifier 218 of the trained font recognition neural network 250.

As shown, the font recognition system obtains an input text image 240. For instance, the font recognition system detects a user's request to identify the font that was used in the input text image 240. For example, the font recognition system receives a copy of the input text image 240 within an application (e.g., a desktop or mobile application). The input text image 240 includes one or more glyphs written in a particular font. In some embodiments, the user provides a cropped selection of the glyphs within the input text image 240.

In response to receiving the input text image 240, the font recognition system uses the trained font recognition neural network 250 to extract the one or more feature vectors based on the input font. In particular, the font recognition system uses the encoder 212 to determine a feature vector 214 for the font used in the input text image 240. As described above, in some embodiments, the font recognition system can generate a multi-dimensional feature vector for the input font.

Using the determined feature vector, the font recognition system generates a font probability vector that identifies the identified font 242 of the input font. To illustrate, the font recognition system employs the font classifier 218 to generate a font probability vector based on the feature vector. In particular, the font classifier 218 compares the feature vector 214 of the font in the input text image 240 to feature vectors of known fonts generated using the trained font recognition neural network 250 to generate the font probability vector (e.g., a 600-dimension feature vector based on 600 known fonts). Using the font probability vector, the font recognition system identifies the identified font 242.

In some embodiments, the feature vector 214 generated for the font in the input text image 240 does not exactly match the feature vector of a known font (e.g., the distance between the two feature vectors will be greater than zero). Further, a known font can have multiple feature vectors, such as one feature vector for each time the known font appeared in a text image in the training font set. Accordingly, in these embodiments, the font recognition system (e.g., the font classifier 218) compares the feature vector 214 of the input font to the average feature representation (i.e., collecting of corresponding feature vectors for a font) of a known font when generating a matching probability for the font. In particular, the font recognition system identifies the known font that has an average feature representation that is the smallest distance from the feature vector of the input font.

Upon determining the identified font 242, the font recognition system can present the identified font 242 to the user. For example, the font recognition system presents the identified font 242 to the user within a graphical user interface. In one or more embodiments, the font recognition system recreates the text in in the input text image 240 using the identified font 242. In various embodiments, the font recognition system automatically applies the identified font 242 to a portion of text within an electronic document.

In some embodiments, the font recognition system determines that the user does not have the identified font 242 on a computing device and assists the user in obtaining (e.g., downloading, purchasing, installing, or otherwise accessing) the identified font 242. In alternative embodiments, if the identified font 242 is too expensive to access, the font recognition system can provide a similar font to the user that is more economical.

Similarly, in one or more embodiments, the font recognition system also provides a list of similar fonts to the user. For example, the font recognition system identifies five fonts from the set of known fonts that are similar (e.g., based on matching probabilities indicated in the font probability vector) to the input font in the input text image 240. In some embodiments, when the font recognition system cannot identify the same font as the input font, the font recognition system provides the closest matching known font.

Figure 3:
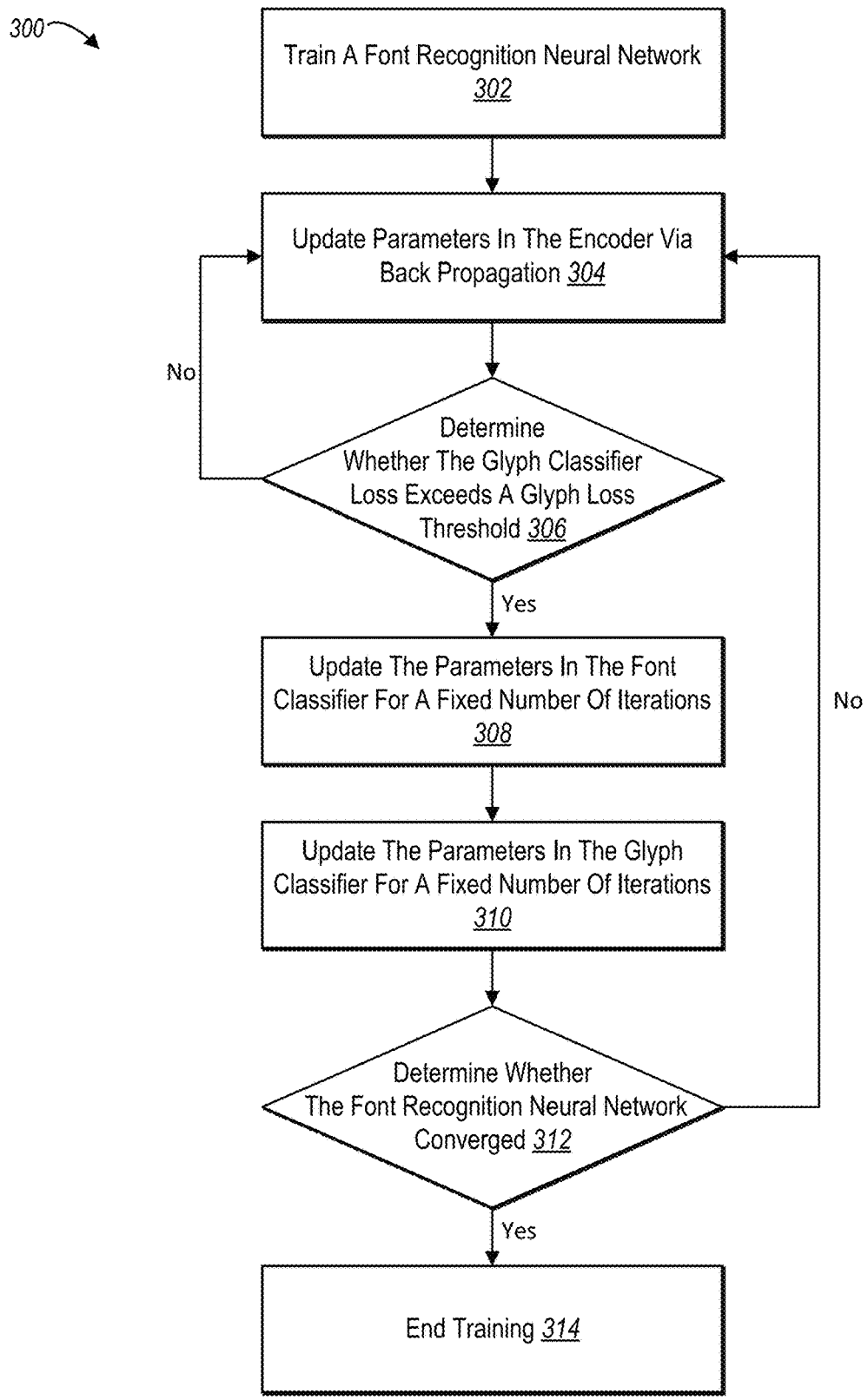
FIG. 3. illustrates a flow diagram of sequentially updating classification parameters while training the font recognition neural network in accordance with one or more embodiments.

Turning now to FIG. 3, additional detail is provided regarding sequentially optimizing a font recognition neural network during the adversarial training. In particular, FIG. 3 illustrates a flow diagram of a series of acts 300 of sequentially updating classification parameters while training a font recognition neural network. In one or more embodiments, the font recognition system implements the series of acts 300. For example, the font recognition system implements the sequence to iteratively optimize a font recognition neural network using adversarial training.

As shown, the font recognition system begins 302 training the font recognition neural network. For example, the font recognition system adds the glyph classifier to the fully-connected layers of the font recognition neural network, as shown in FIG. 2B, and begins adversarially training the font recognition neural network using the text images in a training font set. In this manner, the font recognition system provides the text images to the encoder of the font recognition neural network, which outputs feature vectors to both the font classifier and the glyph classifier. The font classifier attempts to recognize fonts from the feature vectors, and the glyph classifier likewise attempts to recognize glyphs from the same feature vectors.

Because the encoder and the glyph classifier are adversaries, it is very difficult to update competing layers at the same time. Thus, in many embodiments, the font recognition system sequentially updates the encoder and the glyph classifier. To illustrate, FIG. 3 shows the font recognition system updating 304 parameters in the encoder via back propagation. For example, the font recognition system continues to input text images from the training font set to the encoder and provide corresponding error classification losses (e.g., font classification loss and glyph classifier loss) back to the encoder.

As just mentioned, the font recognition system iteratively optimizes the encoder using feedback (e.g., font classification loss and glyph classification loss). As the encoder tunes the feature extraction parameters to mislead the glyph classifier, the glyph classification loss grows. With respect to the conceptual game example described above, the encoder begins to pull away from the glyph classifier in points. Accordingly, as the font recognition system iteratively updates the encoder, the font recognition system determines 306 whether the glyph classification loss exceeds a glyph loss threshold (e.g., threshold t=4.0).

If the glyph loss threshold is not exceeded, the font recognition system continues to update 304 parameters in the encoder via back propagation. In this manner, the font recognition system continues to train the encoder to generate feature vectors that enable the font classifier to accurately identify fonts while also misleading the glyph classifier. Alternatively, if the font recognition system determines that the glyph classification loss exceeds the glyph loss threshold, the font recognition system updates parameters of the font classifier and the glyph classifier. While FIG. 3 illustrates updating parameters of the font classifier before the glyph classifier, in alternative embodiments, the font recognition system updates parameters of the glyph classifier before the font classifier.

As FIG. 3 illustrates, the font recognition system updates 308 the parameters in the font classifier. For instance, the font recognition system tunes the font classification parameters of the font classifier for a fixed number of iterations, such as 200 iterations. By updating the font classifier, the font recognition system optimizes the font classification loss between the feature vectors generated by the encoder and the accuracy of font classifications by the font classifier.

Next, the font recognition system updates 310 the parameters in the glyph classifier. In particular, the font recognition system tunes the glyph classification parameters of the glyph classifier for a fixed number of iterations, such as 200 iterations (or a different number from the font classifier). Updating the parameters of the glyph classifier enables the glyph classifier to better classify glyphs. While the goal of adversarial training is to have the encoder be stronger than the glyph classifier (e.g., the encoder generates feature vectors that mislead the glyph classifier), the font recognition system wants the glyph classifier to be as strong as possible to make the overall training more challenging and, thus, the tunable parameters of the encoder more robust.

In addition, training the glyph classifier via back propagation reduces the glyph classification loss as the glyph classifier increases in accuracy. In particular, training the glyph classifier often reduces the glyph classification loss below the glyph loss threshold. However, if training the glyph classifier does not reduce the glyph classification loss below the glyph loss threshold in the fixed number of iterations, the font recognition system will only update the parameters of the encoder once before returning to train the glyph classifier, as described below. Alternatively, the font recognition system trains the glyph classifier until the glyph classification loss falls below the glyph loss threshold in the fixed number of iterations or falls to a predetermined amount of glyph classification loss (e.g., 2.0).

As shown in FIG. 3, the font recognition system determines 312 whether the font recognition neural network has converged. If the font recognition neural network has converged, the font recognition system ends 314 training. Otherwise, the font recognition neural network repeats the actions of iteratively updating 304 the parameters of the encoder via back propagation until the glyph classification loss exceeds the glyph loss threshold, updating 308 the parameters of the font classifier for a fixed number of iterations, and updating 310 the parameters of the glyph classifier for a fixed number of iterations, until the font recognition neural network converges.

Figure 4:
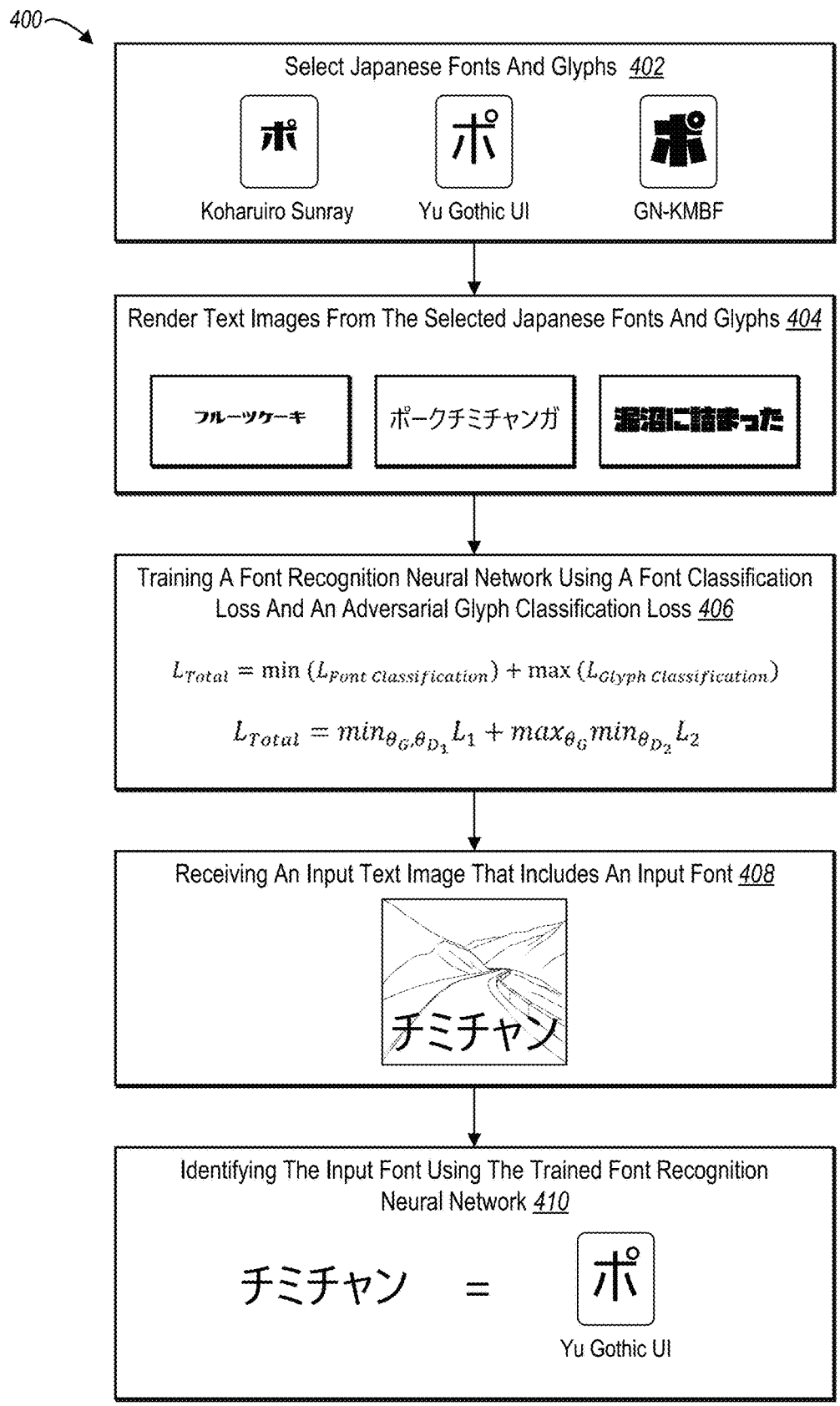
FIG. 4 illustrates acts in performing a step for rendering a set of text images from glyphs and fonts as well as acts in performing a step for training a font recognition neural network using adversarial classification losses in accordance with one or more embodiments.

FIG. 4 illustrates a series of acts 400 in performing a step for rendering a set of text images from a plurality of glyphs and a plurality of digital fonts. In addition, the series of acts 400 includes performing a step for training, based on the plurality of rendered text images, a font recognition neural network using a font classification loss and an adversarial glyph classification loss. In various embodiments, the font recognition system described herein performs the series of acts 400. In some embodiments, the font recognition system is located on a server device and performs one or more of the acts of the series of acts 400 in connection with a client device.

As shown, the series of acts 400 includes the font recognition system selecting 402 Japanese fonts and Japanese glyphs. For example, the font recognition system accesses a font repository and identifies a number of Japanese fonts. The font recognition system can select some, or all, of the identified Japanese fonts. Further, the font recognition system selects a number of Japanese glyphs (e.g., 500 out of the possible 50,000), as described above. In this manner, the font recognition system renders a set of text images from a plurality of glyphs and a plurality of digital fonts.

As also shown, the series of acts 400 includes the font recognition system rendering 404 text images from the selected Japanese fonts and glyphs. As described above, in one or more embodiments, the font recognition system randomly selects a Japanese font as well as one or more Japanese glyphs. The font recognition system then writes the one or more selected glyphs in the selected font. Further, the font recognition system renders the written glyph(s) as a text image. As explained earlier, the font recognition system can render thousands, hundreds-of-thousands, or millions of text images compiled into a training font set.

In addition, in some embodiments, the font recognition system associates metadata with each rendered text image. For example, the font recognition system labels the font and the glyphs used in each text image. As described above, the font recognition system can use the metadata during training to determine accuracy and measure error loss of the font recognition neural network. Further, in the embodiments described in connection with the figures, the font recognition system employs Japanese fonts and Japanese glyphs. In alternative embodiments, the fonts and glyphs correspond to a different language, as previously mentioned.

As shown in FIG. 4, the series of acts 400 includes training 406 a font recognition neural network using a font classification loss and an adversarial glyph classification loss. For instance, the font recognition system trains the font recognition neural network based on the plurality of rendered text images. As described above, training a font recognition neural network can include initially training a convolutional neural network (e.g., the font recognition neural network) using a font classification loss function (i.e., font classification loss model) to obtain initial parameters for font extraction features (e.g., weight parameters), then further train the convolutional neural network using an adversarial glyph classifier loss function (i.e., glyph classification loss model) to further refine the font extraction features.

As part of adversarially training the font recognition neural network, the font recognition system has the encoder (and the font classifier in some instances) compete against the glyph classifier. In particular, the font recognition system optimizes the encoder to generate feature vectors that represent font features well while also discounting glyph features. In this manner, the generated feature vectors are glyph-agnostic—meaning that the feature vectors enable the font classifier to accurately classify the font in an input text image, even with unfamiliar glyphs. Stated differently, the adversarially trained font recognition neural network is more generalized at recognizing fonts written in any glyphs rather than merely the glyphs observed during training.

To illustrate, the following minimax objective function identifies how the font recognition system optimizes overall loss, and font classification loss in particular, while still maximizing glyph classification loss:

$$L_{Total} = \min(L_{Font\ Classification}) + \max(L_{Glyph\ Classification}) \qquad (1)$$

In Equation 1, $L_{Total}$ indicates the overall combined total loss, $L_{Font\ Classification}$ indicates loss from the font classification loss function and $L_{Glyph\ Classification}$ indicates loss from the glyph classification loss function.

In one or more embodiments, the font recognition system can employ softmax cross-entropy loss classifiers for both $L_{Font\ Classification}$ and $L_{Glyph\ Classification}$. For example, the font recognition system employs mean square error (MSE) to determine the font classification loss and/or glyph classification loss. In alternative embodiments, the font recognition system employs a different type of classifier that likewise outputs font probability vectors and/or glyph probability vectors.

In further detail, the minimax objective function $L_{Total}$ can be expressed as the overall objective function:

$$L_{Total} = \min_{\theta_G, \theta_{D_1}} L_1 + \max_{\theta_G} \min_{\theta_{D_2}} L_2 \qquad (2)$$

In Equation 2, $L_1$ represents the cross-entropy loss for the font classifier, and $L_2$ represents the cross-entropy loss for the glyph classifier. In addition, $\theta_G$ represents the parameters in the encoder, $\theta_{D_1}$ represents the parameters in the font classifier, and $\theta_{D_2}$ represents the parameters in the glyph classifier. As shown, the minimax objective function minimizes font classification loss by optimizing the encoder parameters and font classifier parameters. In addition, the minimax objective function also tries to minimize glyph classification loss by optimizing the glyph classification parameters. At the same time, the minimax objective function tries to adversarially maximize the glyph classification loss by tuning the encoder parameters to discount glyph extraction features, such that the encoder generates feature vectors that are indistinguishable between different glyphs.

As described above, in various embodiments, the font recognition system employs alternative optimization (i.e., sequential feedback) between the encoder, the font classifier, and the glyph classifier. For example, the font recognition system optimizes parameters in the encoder to both decrease font classification loss and increase glyph classification loss. As shown in Equation 2, tuning the parameters in the encoder (i.e., $\theta_G$) affects both the font classification loss and the glyph classification loss. Further, after the encoder parameters are tuned, the font recognition system optimizes the font classifier parameters (i.e., $\theta_{D_1}$) to further minimize $L_1$ and the glyph classifier parameters (i.e., $\theta_{D_2}$) to minimize $L_2$ (e.g., to counterbalance the $L_2$ maximizing from tuning the encoder parameters). As described previously, the font recognition system can alternate between optimizing the encoder parameters, font classifier parameters, and glyph classifier parameters until the font recognition neural network converges through training.

As shown in FIG. 4, the series of acts 400 includes receiving 408 an input text image that includes an input font (e.g., a Japanese glyph written in a Japanese font). For example, a user provides an image to the font recognition system that includes text written in an unknown input font. In some embodiments, the input text image can be a flat image file with no metadata and the font recognition system identifies an area of the input image that includes the unknown input font. In another example, the font recognition system automatically receives the text input file with the input font, such as part of a batch operation to identify fonts in text images.

As shown in FIG. 4, the series of acts 400 includes identifying 410 the input font from the input text image using the font recognition neural network. For example, the font recognition system provides the input text image with the input font to the trained font recognition neural network. In response, the font recognition neural network determines a feature vector and a font probability vector for the input font. In addition, as explained earlier, the font recognition system identifies the input font by based on the font probability vector.

In one or more embodiments, the font recognition system identifies the input font on a server device. For example, a client device provides the input text image (or representative data) to the server device, and the server device provides the identified input font back to the client device. In alternative embodiments, the font recognition system resided, at least in part, on a client device and identifies feature vectors and/or font probability vectors for input text images (e.g., a server device provides the trained font recognition neural network to the client device).

Moreover, in one or more embodiments, the font recognition system functions in connection with an application to receive and identify the font in the input text image. For example, a user is using a word-processing or graphic design application and requests to use the font displayed in the input text image. In response, the font recognition system identifies the input font in the input text image using the font recognition neural network and provides the identified font back to the application. Further, in some embodiments, the font recognition system also provides additional similar fonts, as described above.

Figure 5:
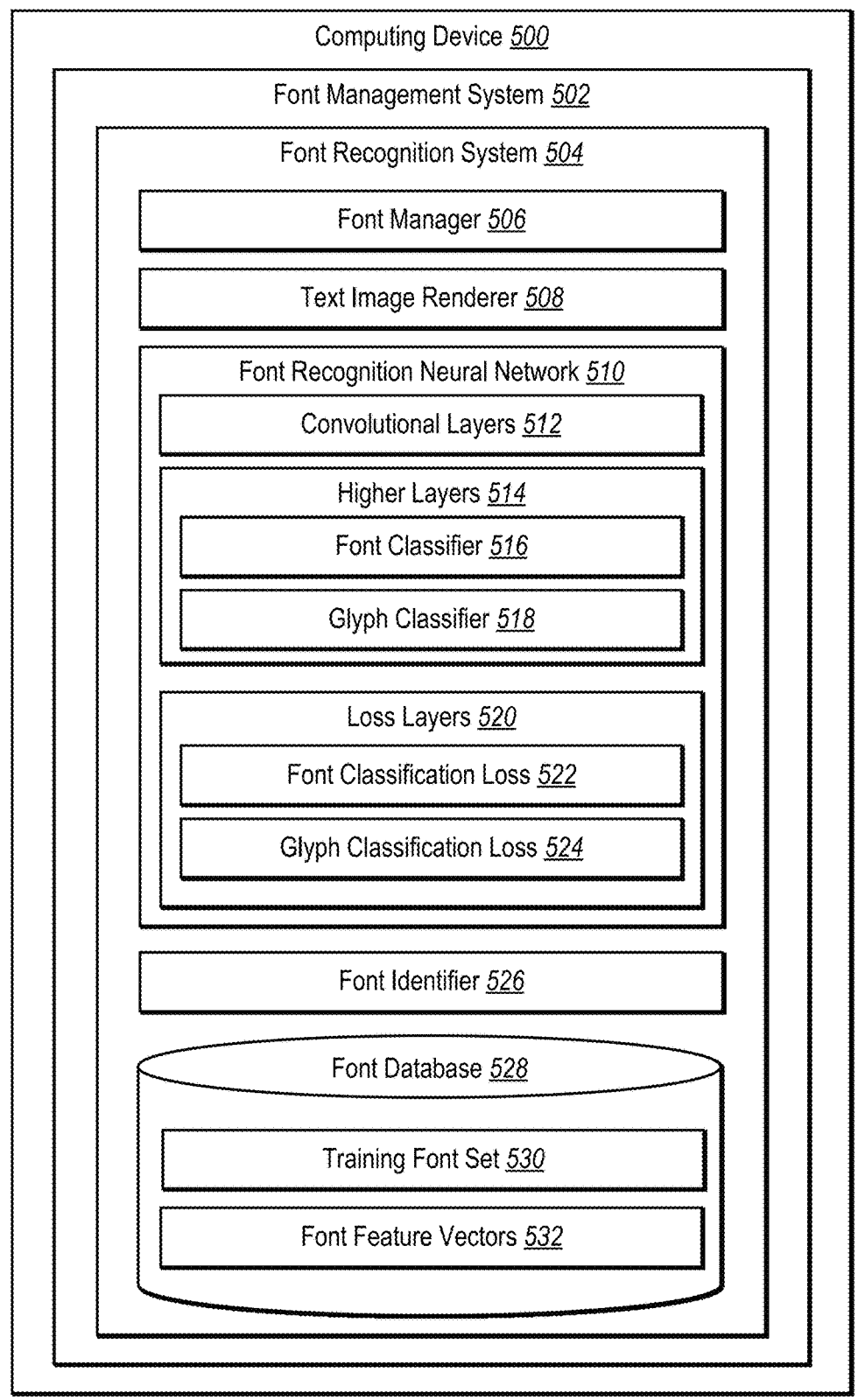
FIG. 5 illustrates a schematic diagram of a font recognition system in accordance with one or more embodiments.

Referring now to FIG. 5, additional detail will be provided regarding capabilities and components of the font recognition system in accordance with one or more embodiments. In particular, FIG. 5 shows a schematic diagram of an example architecture of the font recognition system 504 located within a font management system 502 and hosted on a computing device 500. The font recognition system 504 can represent one or more embodiments of the font recognition system described previously.

As shown, the font recognition system 504 is located on a computing device 500 within a font management system 502. In general, the computing device 500 may represent various types of client devices. For example, in some embodiments, the client is a mobile device, such as a mobile telephone, a smartphone, a PDA, a tablet, a laptop, etc. In other embodiments, the computing device 500 is a non-mobile device, such as a desktop or server, or another type of client device. In some embodiments, portions of the computing device 500 correspond to computing devices of different types (e.g., some components operate on the computing device 500 when acting as a server device and some components operate on the computing device 500 when acting as a client device). Additional details with regard to the computing device 500 are discussed below as well as with respect to FIG. 11.

The font management system 502, in general, facilitates the creation, modification, sharing, installation, and/or deletion of digital fonts within electronic documents and/or system applications. For example, the font management system 502 stores a repository of fonts on the computing device 500, such as in the font database 528. In addition, the font management system 502 can access additional fonts located remotely. Further, in some embodiments, the font management system 502 can be located separately from the computing device 500 and provide fonts to the computing device 500. In one or more embodiments, the font management system 502 comprises ADOBE® TYPEKIT®.

In addition, the font management system 502 can operate in connection with one or more applications to display fonts on the computing device 500. For example, in one or more embodiments, the font management system 502 provides fonts to a word processing application such as ADOBE® ACROBAT®, ADOBE® INDESIGN®, or another word processing application. In other embodiments, the font management system 502 provides fonts to a design application such as ADOBE® ILLUSTRATOR®.

As illustrated in FIG. 5, the font recognition system 504 includes various components. For example, the font recognition system 504 includes a font manager 506, a text image renderer 508, a font recognition neural network 510, a font identifier 526, and a font database 528. As shown, the font database 528 includes a training font set 530 and font feature vectors 532. Each of these components is described below in turn.

The font manager 506 can store, receive, detect, install, order, and/or organize fonts within the computing device 500. For example, in one or more embodiments, the font manager 506 stores a set of fonts on the computing device 500. In some embodiments, the font manager 506, in connection with the font management system 502, maintains fonts within the font database 528. For example, the font manager 506 maintains a set of fonts (e.g., Japanese fonts) that a user can employ in an electronic document. In an additional example, the font manager 506 maintains the training font set 530 (e.g., labeled text images of Japanese fonts). In various embodiments, the font manager 506 can identify and access additional fonts not stored or located on the computing device 500. For instance, the font manager 506 maintains fonts on the computing device 500 corresponding to multiple languages.

The text image renderer 508 can generate text images used to train the font recognition neural network 510. For example, the text image renderer 508 renders text images of randomly selected fonts and glyphs, as previously described. In some embodiments, the text image renderer 508 stores generated text images in the font database 528 as a training font set 530. Further, the text image renderer 508 can label, tag, or otherwise annotate each rendered text image used in training, as explained earlier.

As shown in FIG. 5, the font recognition system 504 includes the font recognition neural network 510. The font recognition neural network 510 includes convolutional layers 512, higher layers 514, and loss layers 520. The convolutional layers 512 can be lower neural network layers that include an encoder that generates feature vectors (e.g., font feature vectors and/or glyph feature vectors) based on input text images. In addition, the convolutional layers 512 can include one or more normalizing and pooling layers to generate the feature vectors.

The higher layers 514 include a font classifier 516 and a glyph classifier 518. As described above, the font classifier 516 analyzes a feature vector generated by the encoder to determine a font for the text image. In particular, based on the feature vector, the font classifier 516 generates a multi-dimensional font probability vector that indicates the probability that a text image corresponds to one or more known fonts. Similarly, the glyph classifier 518 analyzes the same feature vector generated by the encoder to determine one or more glyphs for the text image. In particular, the glyph classifier 518 generates a multi-dimensional glyph probability vector that indicates the probability that a text image corresponds to one or more known glyphs.

The loss layers 520 include a font classification loss 522 and a glyph classification loss 524. As described above, the font recognition system 504 employs one or more machine-learning algorithms to adversarially train the font recognition neural network 510. In particular, the font recognition system 504 employs the training font set 530 to initially train layers of the font recognition neural network 510 using a font classifier 516 and the font classification loss 522, then further train the layers of the font recognition neural network 510 by adding the glyph classifier 518 in connection with the glyph classification loss 524, as described above in detail. For example, the font recognition system 504 trains the font recognition neural network by minimaxing the combined loss between the font classification loss 522 (e.g., minimizing) and the glyph classification loss 524 (maximizing) using end-to-end learning and back propagation.

As described above, the font recognition system 504 employs the glyph classifier 518, and loss layers 520 during training the font recognition neural network 510. In one or more embodiments, once the font recognition neural network 510 is fully trained, the font recognition system 504 no longer employs the glyph classifier 518, the font classification loss 522, or the glyph classification loss 524. However, at a later time, the font recognition system 504 can again use the glyph classifier 518, and loss layers 520 to re-train or further train the font recognition neural network 510.

Using the font recognition neural network 510, the font recognition system 504 generates a set of font feature vectors 532, which are stored in the font database 528. In one or more embodiments, the font recognition system 504 generates the font feature vectors 532 for each of the fonts in the training font set 530 as part of training the font recognition neural network 510. In additional and/or alternative embodiments, the font recognition system 504 generates and stores font feature vectors 532 for different and/or additional fonts than used in the training font set, such as fonts stored on the computing device 500. Because the font recognition system 504 is not classifying glyphs using the trained font recognition neural network 510, the font recognition system 504 need not store glyph feature vectors in the font database 528.

As shown, the font recognition system 504 includes the font identifier 526. The font identifier 526 can receive input fonts within input text images and identify the input font using the trained font recognition neural network 510. In particular, the font identifier 526 identifies one or more font feature vectors for input text within an input text image by delivering the input text image into the trained font recognition neural network 510. In addition, the font identifier 526 compares the one or more feature vectors of the input font to the font feature vectors 532, as explained earlier, to identify the font for the input font (e.g., to generate a font probability vector). Further, the font identifier 526 provides the identified font, for example, to the user that submitted the input text image.

Each of the components 506-532 of the font recognition system 504 can include software, hardware, or both. For example, the components 506-532 can include one or more instructions stored on a computer-readable storage medium and executable by processors of one or more computing devices, such as a client device or server device. When executed by the one or more processors, the computer-executable instructions of the font recognition system 504 can cause the computing device(s) to perform the feature learning methods described herein. Alternatively, the components 506-532 can include hardware, such as a special-purpose processing device to perform a certain function or group of functions. Alternatively, the components 506-532 of the font recognition system 504 can include a combination of computer-executable instructions and hardware.

Furthermore, the components 506-532 of the font recognition system 504 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 506-532 may be implemented as a stand-alone application, such as a desktop or mobile application. Furthermore, the components 506-532 may be implemented as one or more web-based applications hosted on a remote server. The components 506-532 may also be implemented in a suite of mobile device applications or "apps." To illustrate, the components 506-532 may be implemented in an application, including but not limited to ADOBE® TYPEKIT®, ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTOSHOP," and "CREATIVE CLOUD" are either registered trademarks or trademarks of Adobe Systems Incorporated in the United States and/or other countries.

Figure 6:
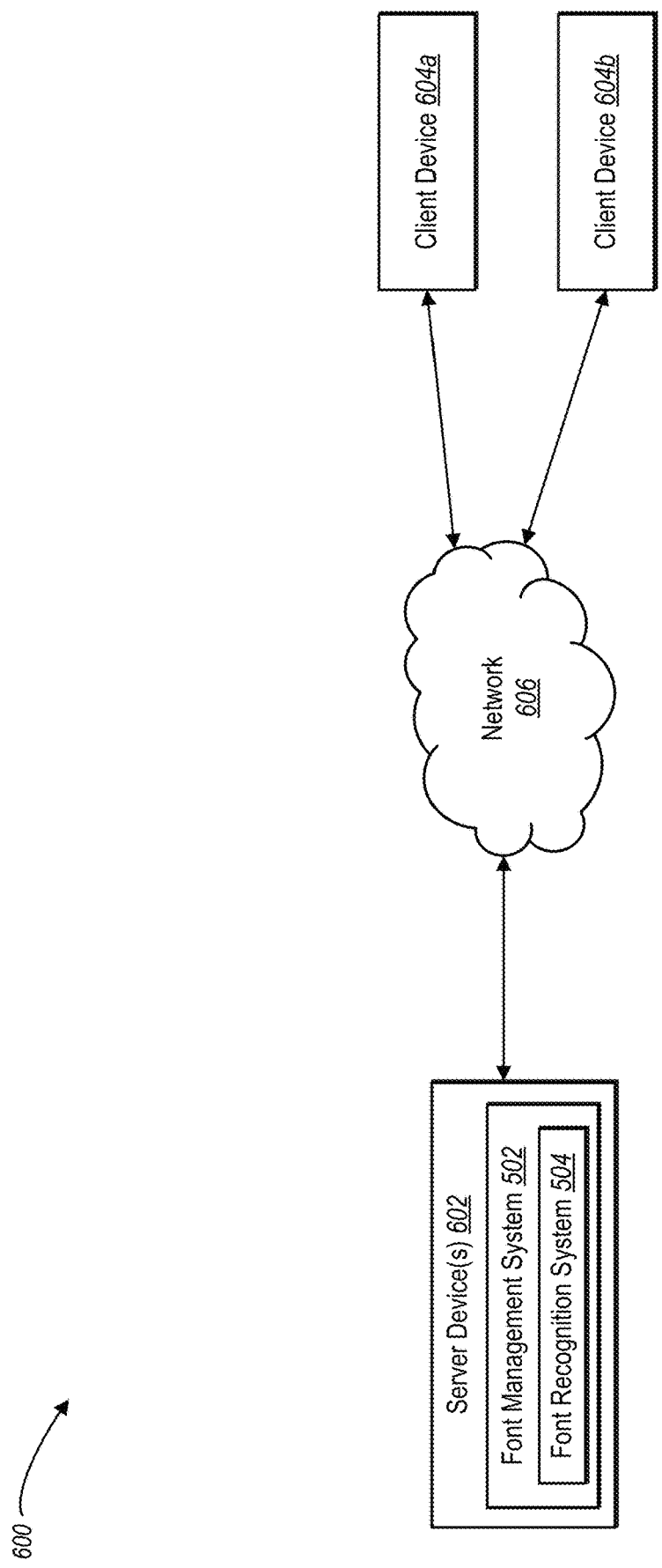
FIG. 6 illustrates a schematic diagram of an exemplary environment in which the font recognition system may be implemented in accordance with one or more embodiments.

FIG. 6 illustrates a schematic diagram of an environment 600 in which the font recognition system 504 may be implemented in accordance with one or more embodiments. In one or more embodiments, the environment 600 includes various computing devices including server device(s) 602 and one or more client devices 604a, 604b. In addition, the environment 600 includes a network 606. The network 606 may be any suitable network over which the computing devices can communicate. Example networks are discussed in more detail below with regard to FIG. 11.

As illustrated in FIG. 6, the environment 600 includes the server device(s) 602, which may comprise any computing device, such as one or more of the computing devices described below in relation to FIG. 11. In addition, the server device(s) 602 includes the font management system 502 and the font recognition system 504, which are described previously. For example, as described above, the font recognition system 504 can adversarially train and apply a font recognition neural network to accurately identify a font (e.g., Japanese font) used in a text image.

In addition, the environment 600 includes the one or more client devices 604a, 604b. The client devices 604a, 604b may comprise any computing device, such as the computing device described below in relation to FIG. 11. As described above, the one or more client devices 604a, 604b can employ the trained font recognition neural network to identify a font within an input text image.

As illustrated, in one or more embodiments, the server device(s) 602 can include all, or a portion of, the font recognition system 504. In particular, the font recognition system 504 can comprise an application running on the server device(s) 602 or a portion of a software application that can be downloaded from the server device(s) 602. For example, the font recognition system 504 can include a web hosting application that allows a client device 604a to interact with content hosted on the server device(s) 602. To illustrate, in one or more embodiments of the environment 600, the client device 604a accesses a web page supported by the server device(s) 602. In particular, the client device 604a can run an application to allow a user to access, view, select, and/or identify a font from a text image within a web page or website hosted at the server device(s) 602 (e.g., a web page enables a user to provide a text image that includes input font, and receive, from the sure, identification of the input font).

Although FIG. 6 illustrates a particular arrangement of the server device(s) 602, the client devices 604a, 604b and the network 606, various additional arrangements are possible. For example, while FIG. 6 illustrates the one or more client devices 604a, 604b communicating with the server device(s) 602 via the network 606, in one or more embodiments a single client device may communicate directly with the server device(s) 602, bypassing the network 606.

Similarly, although the environment 600 of FIG. 6 is depicted as having various components, the environment 600 may have additional or alternative components. For example, the font recognition system 504 can be implemented on multiple computing devices. In particular, the font recognition system 504 may be implemented in whole by the server device(s) 602 or the font recognition system 504 may be implemented in whole by the client device 604a. Alternatively, the font recognition system 504 may be implemented across multiple devices or components (e.g., utilizing the server device(s) 602 and the one or more client devices 604a, 604b).

Figure 7B:
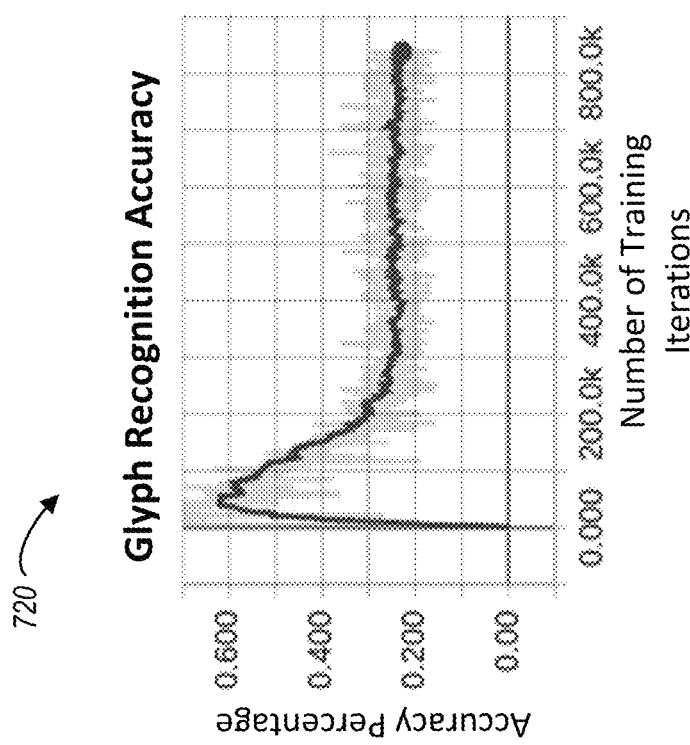
FIGS. 7A and 7B illustrate graphs showing font recognition accuracy and glyph recognition accuracy of a font recognition neural network during training in accordance with one or more embodiments.
Figure 7A:
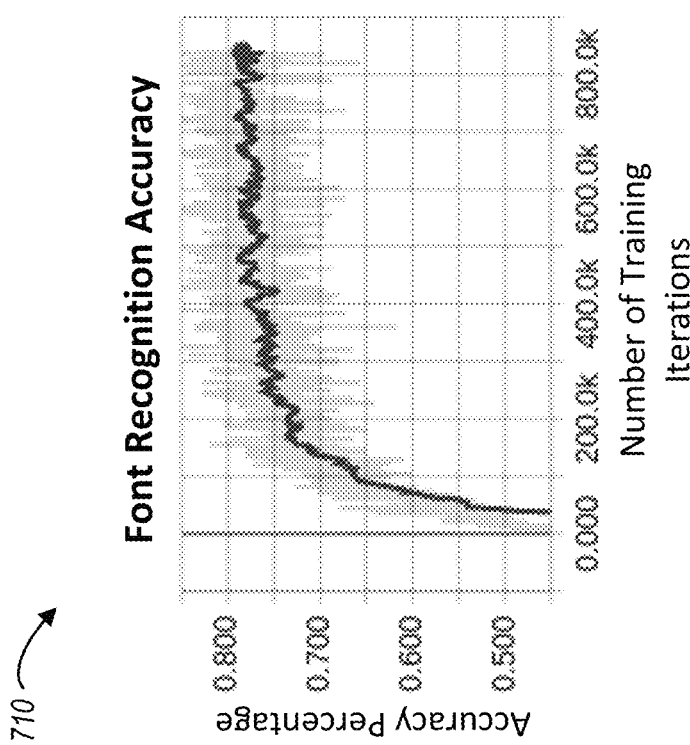
Figure 8:
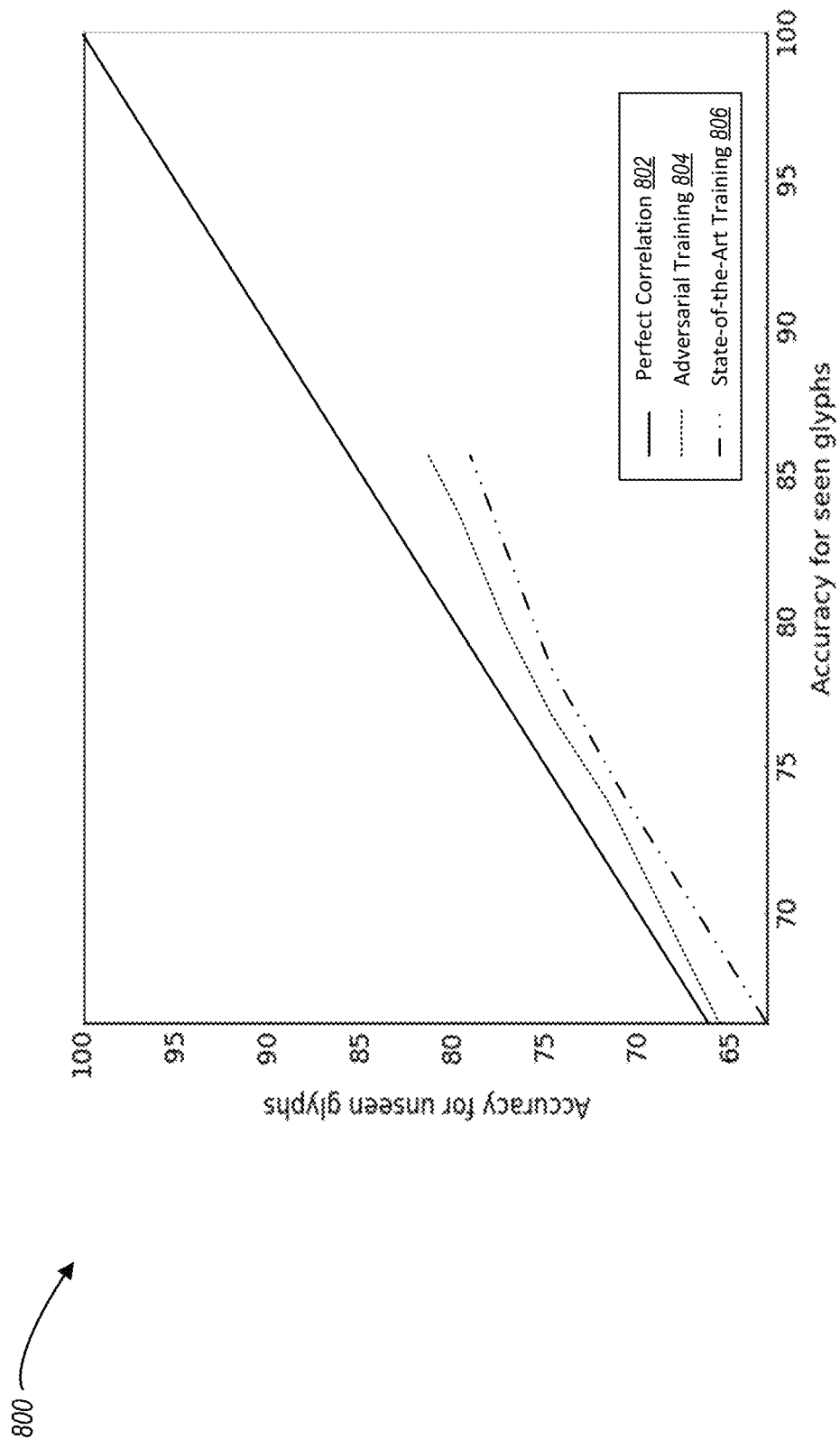
FIG. 8 illustrates a chart comparing generalization capabilities of font recognition between a state-of-the-art font classification system and the font recognition system disclosed herein.

Turning now to FIGS. 7A-7B and FIG. 8, additional detail is provided with respect to training and evaluating the embodiments of the font recognition system. In particular, FIGS. 7A and 7B illustrate graphs displaying levels of font recognition accuracy and corresponding levels of glyph recognition accuracy observed by researchers during training a font recognition neural network. In addition, FIG. 8 illustrates a chart comparing generalization capabilities of font recognition between a state-of-the-art font classification system and the font recognition system disclosed herein.

As shown, FIG. 7A includes a first graph 710 that displays the font recognition accuracy of the font recognition neural network during training. In particular, the first graph 710 shows font recognition accuracy quickly increasing to around 70% in the first one-hundred-thousand iterations of training the font recognition neural network, then more gradually increasing until stabilizing after a few hundred-thousand iterations.

FIG. 7B includes a second graph 720 that displays the glyph recognition accuracy of the font recognition neural network during training. As with the font recognition accuracy in the first graph 710, the glyph recognition accuracy quickly increases to around 60% within the first one-hundred-thousand iterations. However, because the font recognition system trains the font recognition neural network to maximize glyph classification loss, the glyph recognition accuracy begins to fall as training continues. As shown, the glyph recognition accuracy falls to around 20% as the training stabilizes after a few hundred-thousand iterations. Overall, as shown in the first graph 710 and the second graph 720, the font recognition system adversarially trains the font recognition neural network to generate feature vectors that are both good for font classification and poor for glyph classification.

In addition, the researchers performed evaluations between a state-of-the-art font classification system and the font recognition system described herein. In particular, the researchers evaluated the effectiveness of the adversarial training model by measuring the percentage of the test data that correctly classified the font. The test text images employed Japanese glyphs (e.g., Kanji) and fonts. With respect to font accuracy for glyphs seen in training, the font recognition system and the state-of-the-art font classification system both measured around 86%. However, with respect to font accuracy for glyphs unseen in training, the font recognition system outperformed the state-of-the-art font classification system. For instance, in one set of tests, the font recognition system was 2.2% more accurate than the state-of-the-art font classification system (e.g., 81.36% vs. 79.15%), which is a significant advantage. Further, the difference in font recognition accuracy becomes more significant when fewer glyphs are seen during training.

As mentioned above, FIG. 8 shows a chart 800 comparing generalization capabilities of font recognition between a state-of-the-art font classification system and the font recognition system disclosed herein. As shown in the chart 800, the accuracy of unseen glyphs in training (vertical y-axis) is compared to the accuracy of glyphs seen in training (horizontal x-axis) to form an overfitting curve. The chart 800 compares a perfect correlation line 802 (i.e., the solid line), an adversarial training line 804 (i.e., the dotted line), and a state-of-the-art training line 806 (i.e., the dotted-dashed line).

As shown in the chart 800, the perfect correlation line 802 is a one-to-one correlation between seen and unseen glyphs and represents a model where no overfitting occurs because training accuracy and testing accuracy are equal. The adversarial training line 804 represents the font recognition system disclosed herein. As shown, the adversarial training line 804 is closer to the perfect correlation line 802 than the state-of-the-art training line 806, which indicates that the state-of-the-art training font classification system is over fitted to the training font set, and thus, performs more poorly with unseen glyphs. Stated differently, the chart 800 shows that the font recognition system is less likely to overfit to a training font set than the state-of-the-art training font classification system. Thus, the font recognition system is more generalized and robust than the state-of-the-art training font classification system.

As a note, FIGS. 7A, 7B, and 8 describe a comparison between the font recognition system described herein and a state-of-the-art font classification system. When compared to conventional font classification systems, the font recognition system described herein further outperforms these conventional systems. As mentioned above, conventional systems poorly perform font classification with fonts that includes intra-class variances, such as Japanese fonts.

FIGS. 1-8, the corresponding text, and the examples provide a number of different methods, systems, devices, and non-transitory computer-readable media of the font recognition system. In addition to the foregoing, one or more embodiments can also be described in terms of flowcharts comprising acts for accomplishing a particular result. For example, FIG. 9 and FIG. 10 may be performed with more or fewer acts. Further, the acts may be performed in differing orders. Additionally, the acts described herein may be repeated or performed in parallel with one another or parallel with different instances of the same or similar acts.

Figure 9:
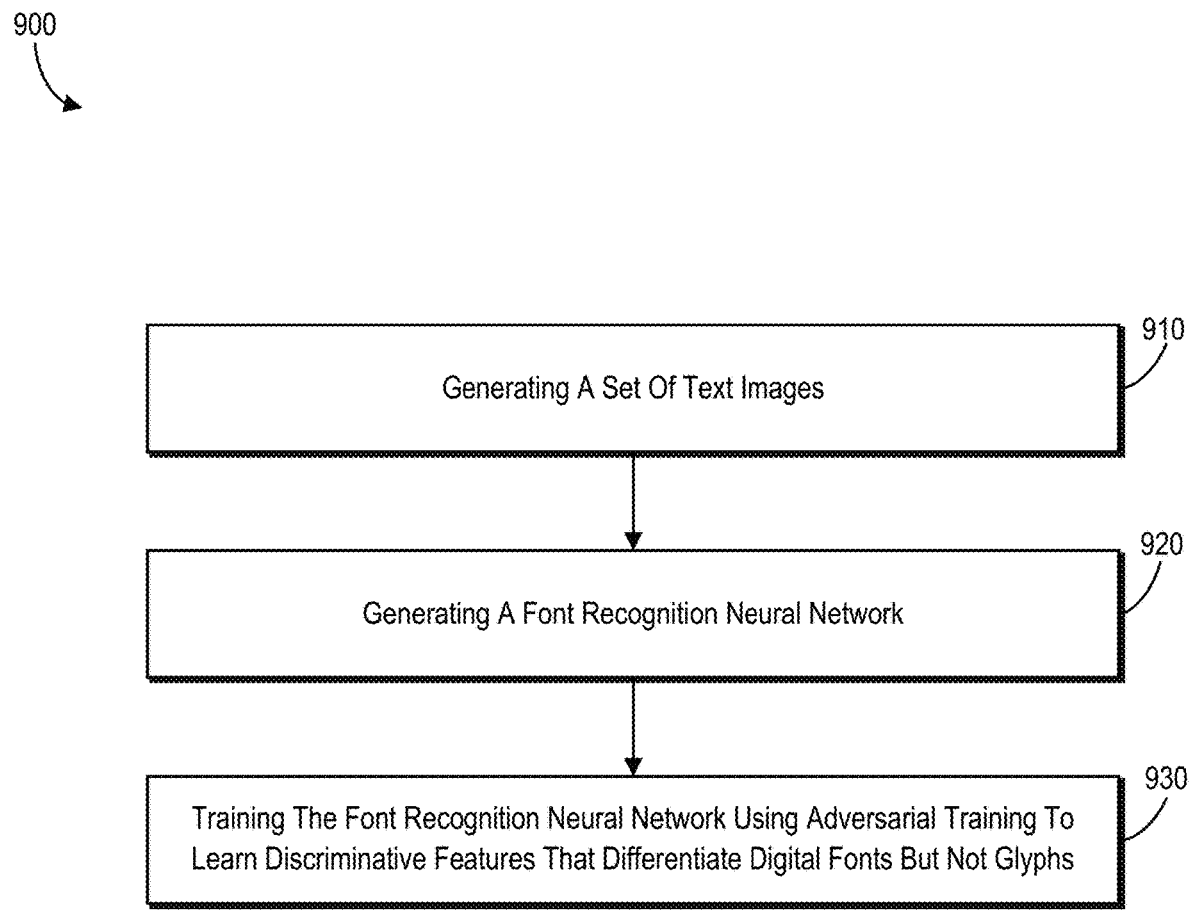
FIG. 9 illustrates a flowchart of a series of acts for adversarially training a font recognition neural network to classify digital fonts in accordance with one or more embodiments.

As mentioned, FIG. 9 illustrates a flowchart of a series of acts 900 for training a font recognition neural network classify digital fonts using supervised adversarial training in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

In one or more embodiments, the series of acts 900 is implemented on one or more computing devices, such as the computing device 500 or the server device(s) 602. In addition, in some embodiments, the series of acts 900 is implemented in a digital environment for creating or editing electronic documents. For example, the series of acts 900 is implemented on a computing device having memory that stores digital fonts and glyphs. In some embodiments, the digital fonts are Japanese fonts, and the glyphs are Japanese glyphs.

The series of acts 900 includes an act 910 of generating a set of text images. In particular, the act 910 can involve generating a set of text images based on randomly selecting one or more glyphs from the plurality of glyphs, selecting a digital font from the plurality of digital fonts for each of the one or more glyphs, and rendering each of the one or more glyphs written in the selected digital font. In some embodiments, the text images include images of Japanese glyphs written in a selected Japanese digital font. In one or more embodiments, the act 910 includes adding noise, blur, rotations, or shading to one or more of the set of text images.

As shown, the series of acts 900 also includes an act 920 of generating a font recognition neural network. In particular, the act 920 can involve generating a font recognition neural network configured to classify digital fonts based on the set of text images. In one or more embodiments, the font recognition neural network is a convolutional neural network that includes convolutional layers and fully-connected layers. In some embodiments, the convolutional layers include a font encoder that outputs font feature vectors based on feature extraction parameters. In various embodiments, the fully-connected layers include a font classifier that classifies digital fonts based on the font feature vectors and outputs a font probability vector.

As shown in FIG. 9, the series of acts 900 further includes an act 930 of training the font recognition neural network using adversarial training to learn discriminative features that effectively differentiate digital fonts but do not effectively differentiate glyphs. In one or more embodiments, the act 930 is based on the set of text images. In some embodiments, the fully-connected layers of the font recognition neural network also include a glyph classifier during training that classifies glyphs based on the font feature vectors and outputs a glyph probability vector.

In additional embodiments, the act 930 can include classifying, for a text image including a glyph written in a selected digital font, a glyph by the glyph classifier based on a font feature vector outputted by the encoder for the text image; comparing the classified glyph to the glyph in the text image to determine whether the glyph classifier correctly classified the glyph in the text image; and providing, based the glyph classifier correctly classifying the glyph in text image, feedback to the encoder to modify the feature extraction parameters to cause the glyph classifier to misclassify the glyph. In various embodiments, the act 930 can include training the font recognition neural network by minimizing cross-entropy loss to the font classifier while maximizing cross-entropy loss to the glyph classifier.

The series of acts 900 can also include a number of additional acts. In one or more embodiments, the series of acts 900 includes the acts of training the font recognition neural network by sequentially updating the encoder, font classifier, and glyph classifier via back propagation until the font recognition neural network converges. In additional embodiments, the series of acts 900 includes the acts of training the font recognition neural network by iteratively providing feedback to the encoder until the cross-entropy loss to the glyph classifier exceeds a glyph loss threshold; providing, upon the glyph loss threshold being exceeded, feedback to the font classifier for a first fixed number of iterations; providing feedback to the glyph classifier for a second fixed number of iterations. In some embodiments, the first fixed number of iterations and the second fixed number of integrations are the same. In alternative embodiments, the first fixed number of iterations differs from the second fixed number of integrations. Further, in additional embodiments, the encoder competes against the glyph classifier to maximize glyph classification loss while the glyph classifier competes against the encoder to minimize glyph classification loss.

In some embodiments, the series of acts 900 includes the acts of receiving an input text image including glyphs written in an input digital font; generating a font probability vector for the input digital font using the trained font recognition neural network comparing a font feature vector of the input digital font to font feature vectors of known digital fonts generated using the font recognition neural network; identifying the input digital font based on the font probability vector, and presenting the identified input digital font. In some embodiments, the input text image includes glyphs not included in the training font set.

Figure 10:
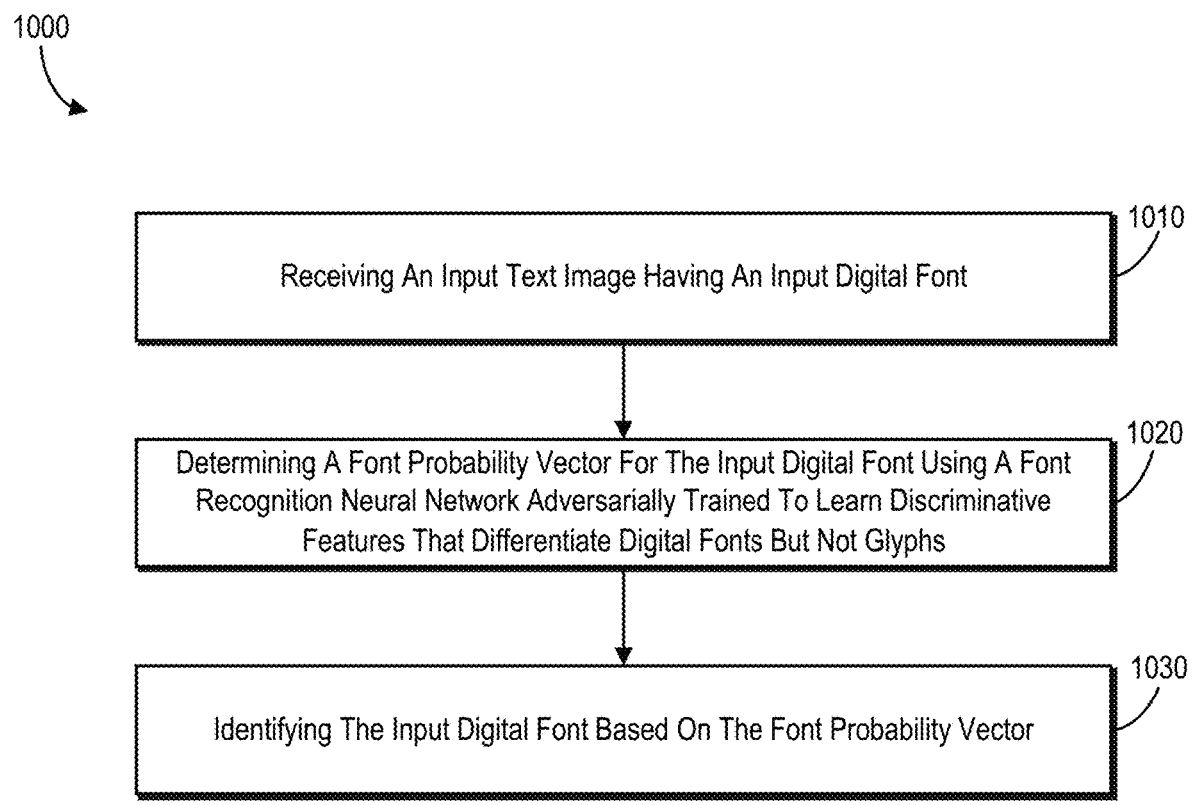
FIG. 10 illustrates a flowchart of a series of acts for identifying an input font in an input image using the adversarially trained font recognition neural network in accordance with one or more embodiments.

As mentioned previously, FIG. 10 illustrates a flowchart of a series of acts 1000 for identifying an input font in an input image using the adversarially trained font recognition neural network in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In one or more embodiments, a system can perform the acts of FIG. 10. In some embodiments, the series of acts 1000 is implemented by a computing system on one or more computing devices, such as the computing device 500 or the server device(s) 602.

As shown, the series of acts 1000 includes an act 1010 of receiving an input text image having an input digital font. In one or more embodiments, the act 1010 includes receiving the input text image from a user and/or an application. In some embodiments, the input digital font and known digital fonts, described below, include Japanese digital fonts.

The series of acts 1000 also includes an act 1020 of determining a font probability vector for the input digital font using a font recognition neural network adversarially trained to learn discriminative features that effectively differentiate digital fonts but do not effectively differentiate glyphs. In particular, the font recognition neural network is adversarially trained using an encoder, a font classifier, and an adversarial glyph classifier, where the trained font recognition neural network employs the encoder and the font classifier to identify digital fonts.

In addition, the series of acts 1000 includes an act 1030 of identifying the input digital based on the font probability vector. In particular, the act 1030 can involve identifying the input digital font from known digital fonts based on the font probability vector for the input digital font. In some embodiments, the act 1030 includes comparing a feature vector of the input digital font to averaged feature representations corresponding to each of the known digital fonts to generate the font probability vector.

The series of acts 1000 can also include a number of additional acts. In one or more embodiments, the series of acts 1000 includes the act of presenting the identified input digital font to a user. In various embodiments, the input text image includes glyphs not included in a training font set associated with the known digital fonts.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the font recognition system to adversarially train and employ a font recognition neural network, as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
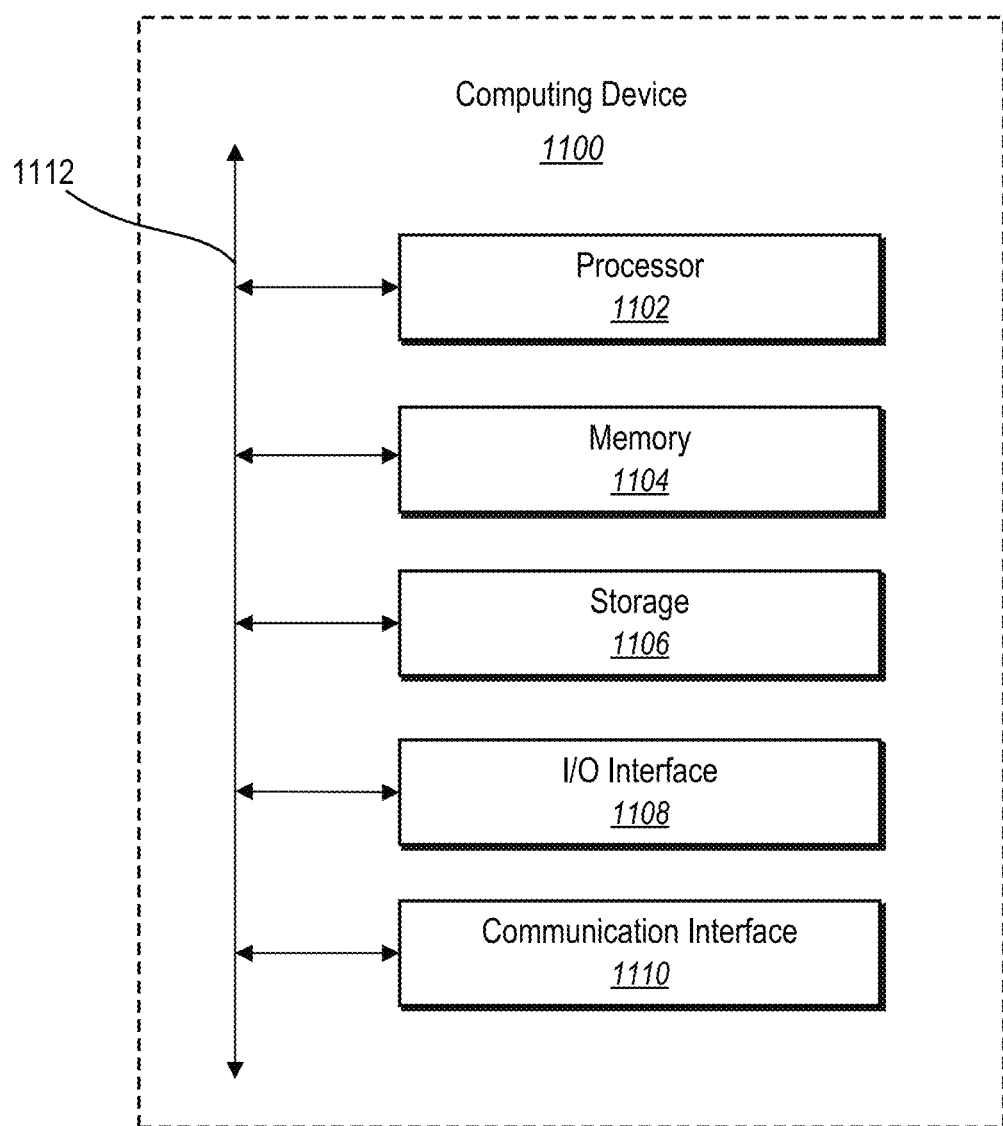
FIG. 11 illustrates a block diagram of an exemplary computing device for implementing one or more embodiments of the present disclosure.

FIG. 11 illustrates a block diagram of an exemplary computing device 1100 that may be configured to perform one or more of the processes described above. One will appreciate that one or more computing devices, such as the computing device 1100 may represent the computing devices described above (e.g., computing device 500, server device(s) 602, and client devices 604a-b). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output ("I/O") interfaces 1108, and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system for training a neural network to classify digital fonts using supervised adversarial training comprising:
 a memory comprising:
  a plurality of digital fonts; and
  a plurality of glyphs;
 at least one processor; and
 at least one non-transitory computer-readable storage medium storing instructions that, when executed by the at least one processor, cause the system to:
  generate a set of text images based on:
   selecting one or more glyphs from the plurality of glyphs,
   selecting a digital font from the plurality of digital fonts for each of the one or more glyphs, and
   rendering each of the one or more glyphs written in the selected digital font;
  generate a font recognition neural network configured to classify digital fonts; and
  train, based on the set of text images, the font recognition neural network using adversarial training by minimizing a loss for a font classifier while maximizing a loss for a glyph classifier to learn discriminative features that effectively differentiate digital fonts.

2. The system of claim 1, wherein the set of text images comprises images of Japanese glyphs written in a selected Japanese digital font.

3. The system of claim 1, wherein:
 the font recognition neural network is a convolutional neural network that comprises convolutional layers and fully-connected layers;
 the convolutional layers comprise a font encoder that outputs font feature vectors based on feature parameters;
 the fully-connected layers comprise the font classifier that classifies digital fonts based on the font feature vectors and outputs a font probability vector; and
 the fully-connected layers further comprise the glyph classifier during training that classifies glyphs based on the font feature vectors and outputs a glyph probability vector.

4. The system of claim 3, wherein the instructions further cause the system to train the font recognition neural network by:

classifying, for a text image comprising a glyph written in a selected digital font, the glyph by the glyph classifier based on a font feature vector outputted by the font encoder for the text image;

comparing the classified glyph to the glyph in the text image to determine whether the glyph classifier correctly classified the glyph in the text image; and providing, based the glyph classifier correctly classifying the glyph in text image, feedback to the font encoder to modify the feature parameters to cause the glyph classifier to misclassify the glyph.

5. The system of claim 3, wherein the instructions further cause the system to train the font recognition neural network by minimizing cross-entropy loss to the font classifier while maximizing cross-entropy loss to the glyph classifier.

6. The system of claim 5, wherein the instructions further cause the system to train the font recognition neural network by sequentially updating the font encoder, font classifier, and glyph classifier via back propagation until the font recognition neural network converges.

7. The system of claim 6, wherein the instructions further cause the system to train the font recognition neural network by:
iteratively providing feedback to the font encoder until the cross-entropy loss to the glyph classifier exceeds a glyph loss threshold;
providing, upon the glyph loss threshold being exceeded, feedback to the font classifier for a first fixed number of iterations; and
providing, upon the glyph loss threshold being exceeded, feedback to the glyph classifier for a second fixed number of iterations.

8. The system of claim 6, wherein the font encoder competes against the glyph classifier to maximize glyph classification loss while the glyph classifier competes against the font encoder to minimize glyph classification loss.

9. The system of claim 1, further comprising instructions that, when executed by the at least one processor, cause the system to add noise, blur, rotations, or shading to one or more of the set of text images.

10. The system of claim 1, further comprising instructions that, when executed by the at least one processor, cause the system to:
receive an input text image comprising glyphs written in an input digital font;
determine a font probability vector for the input digital font using the trained font recognition neural network by comparing a font feature vector of the input digital font to font feature vectors of known digital fonts generated using the font recognition neural network;
identify the input digital font based on the font probability vector; and
present the identified input digital font.

11. The system of claim 10, wherein the input text image comprises glyphs not included in the generated set of text images.

12. A non-transitory computer-readable medium storing instructions that, when executed by at least one processor, cause a computer system to:
receive an input text image comprising an input digital font;
determine a font probability vector for the input digital font using a font recognition neural network adversarially trained by minimizing a loss for a font classifier while maximizing a loss for a glyph classifier to learn discriminative features that effectively differentiate digital fonts; and
identify the input digital font from known digital fonts based on the font probability vector for the input digital font.

13. The non-transitory computer-readable medium of claim 12, wherein the input digital font and the known digital fonts comprise Japanese digital fonts.

14. The non-transitory computer-readable medium of claim 12, wherein the font recognition neural network is trained using an encoder, the font classifier, and an adversarial glyph classifier, and wherein the font recognition neural network employs the encoder and the font classifier to identify digital fonts.

15. The non-transitory computer-readable medium of claim 12, further comprising instructions that, when executed by the at least one processor, cause the computer system to present the identified input digital font to a user.

16. The non-transitory computer-readable medium of claim 12, wherein the input text image comprises glyphs not included in a training font set associated with the known digital fonts.

17. In a digital medium environment for creating or editing electronic documents, a computer-implemented method of searching for and identifying images of digital fonts, comprising:
receiving an input text image comprising an input digital font;
determining a font probability vector for the input digital font using a font recognition neural network adversarially trained by minimizing a loss for a font classifier while maximizing a loss for a glyph classifier to learn discriminative features that effectively differentiate digital fonts; and
identifying the input digital font from known digital fonts based on the font probability vector for the input digital font.

18. The method of claim 17, further comprising:
identifying the input digital font from known digital fonts using the font recognition neural network; and
presenting the identified input digital font.

19. The method of claim 17, wherein the input digital font and the known digital fonts comprise Japanese digital fonts.

20. The method of claim 17, wherein the input text image comprises glyphs not included in a training font set associated with the known digital fonts.

* * * * *